US011308067B2

(12) United States Patent
Nielsen et al.

(10) Patent No.: US 11,308,067 B2
(45) Date of Patent: Apr. 19, 2022

(54) ASSOCIATING FLOWS IN DIFFERENT STATES TO A DATABASE RECORD

(71) Applicant: salesforce.com, inc., San Francisco, CA (US)

(72) Inventors: Matthew Quinn Nielsen, San Francisco, CA (US); Ji Wang, Fremont, CA (US); Jason Teller, San Bruno, CA (US); Jonathan Aniano, San Mateo, CA (US); Owen Winne Schoppe, Orinda, CA (US); Brett Schuenemann, San Francisco, CA (US); Jianming Shao, Fremont, CA (US); Joshua Giblette, Spokane, WA (US); Alicia Charmaine Williams, Sacramento, CA (US); Peng-Wen Chen, Foster City, CA (US); Samuel Paul, Foster City, CA (US); Yamuna Esaiarasan, Fremont, CA (US); Reddy Prasad Yerradoddi, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 137 days.

(21) Appl. No.: 16/138,322

(22) Filed: Sep. 21, 2018

(65) Prior Publication Data

US 2020/0097577 A1    Mar. 26, 2020

(51) Int. Cl.
G06F 16/00     (2019.01)
*G06F 16/23*   (2019.01)
*G06F 3/0482*  (2013.01)
*G06Q 30/00*   (2012.01)
*G06F 16/25*   (2019.01)

(52) U.S. Cl.
CPC ............ *G06F 16/23* (2019.01); *G06F 3/0482* (2013.01); *G06F 16/25* (2019.01); *G06Q 30/01* (2013.01)

(58) Field of Classification Search
CPC ........ G06F 16/23; G06F 16/25; G06F 3/0482; G06F 16/252; G06Q 30/01; G06Q 20/1085; G06Q 20/3221; G06Q 20/3223; G06Q 10/06316; G06Q 10/0637
USPC ....................................................... 707/609
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,748,959 A | 5/1998 | Reynolds |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Vincent F Boccio
(74) *Attorney, Agent, or Firm* — Weaver Austin Villeneuve & Sampson LLP

(57) ABSTRACT

Disclosed are examples of systems, apparatuses, methods and computer program products for maintaining flows to manage tasks assigned to a user of a database system. Further disclosed are examples of systems, apparatuses, methods and computer program products for sharing execution logic, including but not limited to running instances of flows, across different users of a database system.

20 Claims, 16 Drawing Sheets

(56) References Cited

U.S. PATENT DOCUMENTS

| | | |
|---|---|---|
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,844,554 A * | 12/1998 | Geller .................. G06F 8/38 715/744 |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,330,822 B1 | 2/2008 | Robson et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,123,120 B2 * | 2/2012 | Couper ............... G07F 19/206 235/379 |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,197,513 B2 | 11/2015 | Vasudev et al. |
| 9,215,096 B2 | 12/2015 | Vasudev et al. |
| 9,710,127 B2 | 7/2017 | Torman et al. |
| 9,805,051 B2 | 10/2017 | Bergner et al. |
| 9,983,759 B1 | 5/2018 | Dhawan et al. |
| 2001/0044791 A1 | 11/2001 | Richter et al. |
| 2002/0072951 A1 | 6/2002 | Lee et al. |
| 2002/0077919 A1 * | 6/2002 | Lin ................. G06Q 30/0635 705/26.81 |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |

(56) References Cited

U.S. PATENT DOCUMENTS

| | | |
|---|---|---|
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0074915 A1* | 4/2006 | Bhandarkar ............ G06F 3/048 707/999.009 |
| 2006/0179061 A1* | 8/2006 | D'Souza ............... G06F 16/283 |
| 2008/0249972 A1 | 10/2008 | Dillon |
| 2009/0063415 A1 | 3/2009 | Chatfield et al. |
| 2009/0064280 A1 | 3/2009 | Babeanu et al. |
| 2009/0100342 A1 | 4/2009 | Jakobson |
| 2009/0177744 A1 | 7/2009 | Marlow et al. |
| 2009/0212105 A1* | 8/2009 | Couper ............... G06Q 20/105 235/379 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0278388 A1 | 11/2012 | Kleinbert et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0106736 A1 | 4/2015 | Torman et al. |
| 2015/0142596 A1 | 5/2015 | Jakobson et al. |
| 2015/0172563 A1 | 6/2015 | Jakobson et al. |
| 2016/0048281 A1 | 2/2016 | Vasudev et al. |
| 2016/0065522 A1 | 3/2016 | Vasudev et al. |
| 2016/0171399 A1* | 6/2016 | Santhanam ...... G06Q 10/06316 705/7.36 |
| 2016/0275760 A1* | 9/2016 | Block ................ G06Q 20/3223 |
| 2017/0075919 A1 | 3/2017 | Bose et al. |
| 2017/0344245 A1 | 11/2017 | Kumar et al. |
| 2018/0129359 A1 | 5/2018 | Torman et al. |
| 2018/0173779 A1 | 6/2018 | Lee et al. |
| 2018/0181636 A1 | 6/2018 | Lee et al. |
| 2018/0260579 A1 | 9/2018 | Bose et al. |
| 2020/0097979 A1 | 3/2020 | Dubey et al. |

OTHER PUBLICATIONS

U.S. Office Action dated Aug. 13, 2020 issued in U.S. Appl. No. 16/138,309.

U.S. Office Action dated Aug. 25, 2020 issued in U.S. Appl. No. 16/138,309.

U.S. Final Office Action dated Dec. 8, 2020 issued in U.S. Appl. No. 16/138,309.

U.S. Office Action dated Apr. 19, 2021 issued in U.S. Appl. No. 16/138,309.

Salesforce, [Webpage] "How to give Edit access to a user to the records that are not owned by him" Salesforce Stack Exchange, May 23, 2017, pp. 1-3. [retrieved on Apr. 14, 2021] <URL: https://usalesforce.stackexchange.com/questions/175660/how-to-give-edit-access-to-a-user-to-the-records-that-are-not-owned-by-him>.

* cited by examiner

FIG. 2

ASSOCIATING FLOWS IN DIFFERENT STATES TO A DATABASE RECORD

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to managing agent tasks in a database system. More specifically, this patent document discloses techniques for maintaining flows to manage agent tasks using a database system. This patent document further discloses techniques for sharing execution logic, including but not limited to running instances of flows, across different users of a database system.

BACKGROUND

"Cloud computing" services provide shared resources, applications, and information to computers and other devices upon request. In cloud computing environments, services can be provided by one or more servers accessible over the Internet rather than installing software locally on in-house computer systems. As such, users can interact with cloud computing services to undertake a wide range of agent tasks described by flows.

BRIEF DESCRIPTION OF THE DRAWINGS

The included drawings are for illustrative purposes and serve only to provide examples of possible structures and operations for the disclosed inventive systems, apparatus, methods and computer program products for managing flows described by metadata stored in a database. These drawings in no way limit any changes in form and detail that may be made by one skilled in the art without departing from the spirit and scope of the disclosed implementations.

FIG. 2 shows an example of a presentation 200 displayed on a computing device in the form of a graphical user interface (GUI) for maintaining flows to manage agent tasks in accordance with some implementations.

DETAILED DESCRIPTION

Figure 1:
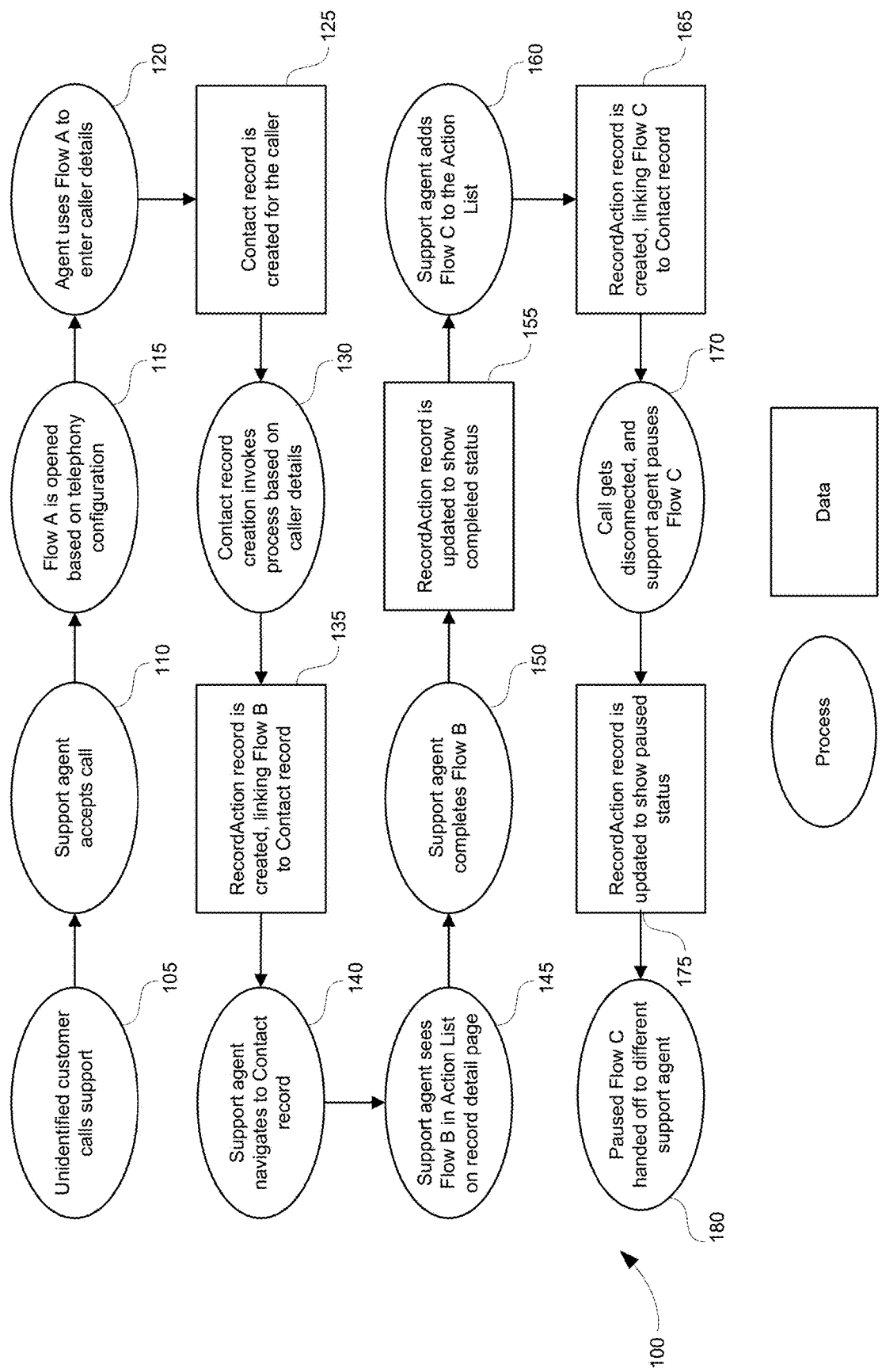
FIG. 1 shows a flowchart of an example of a computer-implemented method 100 for maintaining flows to manage agent tasks assigned to a user of a computing system, performed in accordance with some implementations.

Examples of systems, apparatus, methods and computer-readable storage media according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for managing flows that describe support agent tasks, such as following a greeting script, performing an intake process for an insurance claim, verifying caller information for withdrawing funds from a bank account, and so forth. One non-limiting example of a computing system for maintaining flows is the Salesforce® Service Cloud platform, which offers computer-telephony integration, case management, help articles, support communities, and intelligent suggestions, and is provided by salesforce.com, inc. As discussed herein, a flow can be a screen-based process described by metadata in one or more data objects stored and maintained in a database system, and a flow, for example, identifies a set of support agent tasks related to a support function. For example, a flow definition might be stored in a database and associated with a particular database object that identifies a record (e.g., case, contact, account, etc.) that is generated or modified by support agent tasks specified in the flow definition, such as updating a newly created contact after verifying details of an unidentified caller. In a class of implementations, flows are established using a declarative builder interface (i.e., clicks, not code) operated by administrators, partners, or third parties.

Oftentimes an organization experiences a high turnover rate in the pool of support agents. The disclosed techniques for contextualizing flows to particular database records and the dynamic management, queuing, and execution of flows can be used to accelerate onboarding of support agents, promote consistency across different support agents, simplify auditing of support agents, and so forth. By way of example, Cho has recently joined Aqmi, an aquarium maintenance and installation solutions provider. Cho's computing device receives emails, calls, and SMS texts regarding various aquarium installations in his assigned geographic region. Because of the diverse deployment scenarios (water chemistry, gallons capacity, filtration type, livestock profile, etc.), Aqmi uses a cloud-based framework to declaratively create and manage flows, a screen-based interface for processes, to allow Cho to efficiently perform complex, multi-stage, non-linear support functions (triage for imminent failure of aquarium structural members, diagnose fish pathologies, identify replacement mechanical parts, etc.) after only a short onboarding process. Moreover, based on configuration by Maria, a system administrator, Jill, a 10 year veteran at Aqmi, and Cho can both have flow interfaces that display the same set of flows, thereby providing consistency between different support agents. Aqmi's framework for the dynamic management and execution of flows can also be tied into auditing systems for fair and efficient quality control. For instance, in the support context, support agents are often compensated on volume, such as the number of calls logged, rather than quality. Using the disclosed techniques, a support agent can be compensated based on successfully closing out flows. Under this auditing system, a support agent might be more likely to focus on closing flows for support cases, rather than accepting as many support cases as possible, sacrificing the time spent on each support case.

Additionally, oftentimes an organization provides multiple support channels, such as phone, chat, email, SMS, social networking platforms (e.g., Chatter®, Facebook®, etc.), bots, etc. The disclosed techniques can also be used to promote a uniform support experience across the different support channels, such as by automatically launching flows based on the channel type, passing data from the channel into a flow to interact with a data object (e.g., automatically perform a database lookup using a phone number for an incoming call, etc.), managing handing off of paused flows between support agents using database platform sharing rules, setting default and pinned flows (e.g., mandatory greeting/wrapup flows, etc.), and enabling customized logic for queuing and launching flows (e.g., skip identity verification flow if user is logged in, skip issue determination if support issue previously identified, etc.).

FIG. 1 shows a flowchart of an example of a computer-implemented method 100 for maintaining flows to manage agent tasks assigned to a user of a computing system, performed in accordance with some implementations. By way of example, at 105, Cho's computing device receives a phone call from Prunella, an aquarium owner inquiring about a large crack in her aquarium, and at 110, Cho accepts the call from Prunella.

At 115, based on the channel type, phone, Cho's flow interface displays a Flow A corresponding to verifying caller identity and entering caller details (120) that is automatically queued based on the detected channel type, and is arranged in a list of flows prior to flows relating to, for example, establishing aquarium specifications, crack assessment, water damage assessment, and so forth. At 125, the phone number is used to index a database of aquarium installations to determine that a contact record for Prunella does not exist in the database, and the database is configured to create a new contact record for Prunella.

At 130, the act of creating the new contact record for Prunella invokes a process based on the caller details for Prunella. At 135, the process creates an instance of a data object (e.g., a junction object referred to in FIG. 1 as a RecordAction) that associates metadata defining Flow B (e.g., establish aquarium specifications) to Prunella's contact record. At 140, Cho's flow interface loads Prunella's contact record detail page, and at 145, Cho's flow interface displays the Flow B for establishing aquarium specifications in a list of tasks (also referred to herein as actions). At 150, Cho determines relevant aquarium specifications (e.g., glass versus acrylic, pane dimensions, warranty status, etc.), and at 155, the RecordAction record is updated to indicate that the establish aquarium specifications flow is completed. At 160, based on the reason for Prunella's call, a crack in her glass aquarium, Cho manually adds Flow C, a crack assessment flow, to the action list. At 165, the act of adding the new Flow C invokes a process that creates another instance of a junction object (e.g., a RecordAction record) that associates Flow C (e.g., crack assessment) to Prunella's contact record.

In some implementations, Aqmi's system administrators can define logic that automatically queues a Flow D relating to water damage assessment anytime a combination of a glass aquarium indicated in a database record and the presence of a crack assessment flow is detected, which similarly invokes a process associating the newly added flow to Prunella's contact record.

Halfway through the phone call, Cho's computing device drops connectivity to Prunella (170), and the flow for crack assessment is paused (175). Shortly afterwards, Aqmi receives a chat message from Prunella regarding the crack. Since Cho is actively supporting a different matter, Prunella's communication is handed off (180) to Jill based on conformance to rules regarding privacy, geographic region, language, and so forth. Because Prunella already logged in to Aqmi's system in order to utilize the chat interface, the identity verification flow is not included in Jill's flow interface. Based on the indications in the instance of the junction object (e.g., RecordAction record), Jill can resume the crack assessment flow based on where the flow was previously paused. However, prior to resuming, Aqmi's system administrators have defined logic that automatically pins an initial greeting flow having a similar script to the greeting script provided by Cho for the telephone channel, thereby providing a uniform experience across both the chat and phone channels, and also providing a uniform experience between the different support agents, Cho and Jill.

Figure 2:
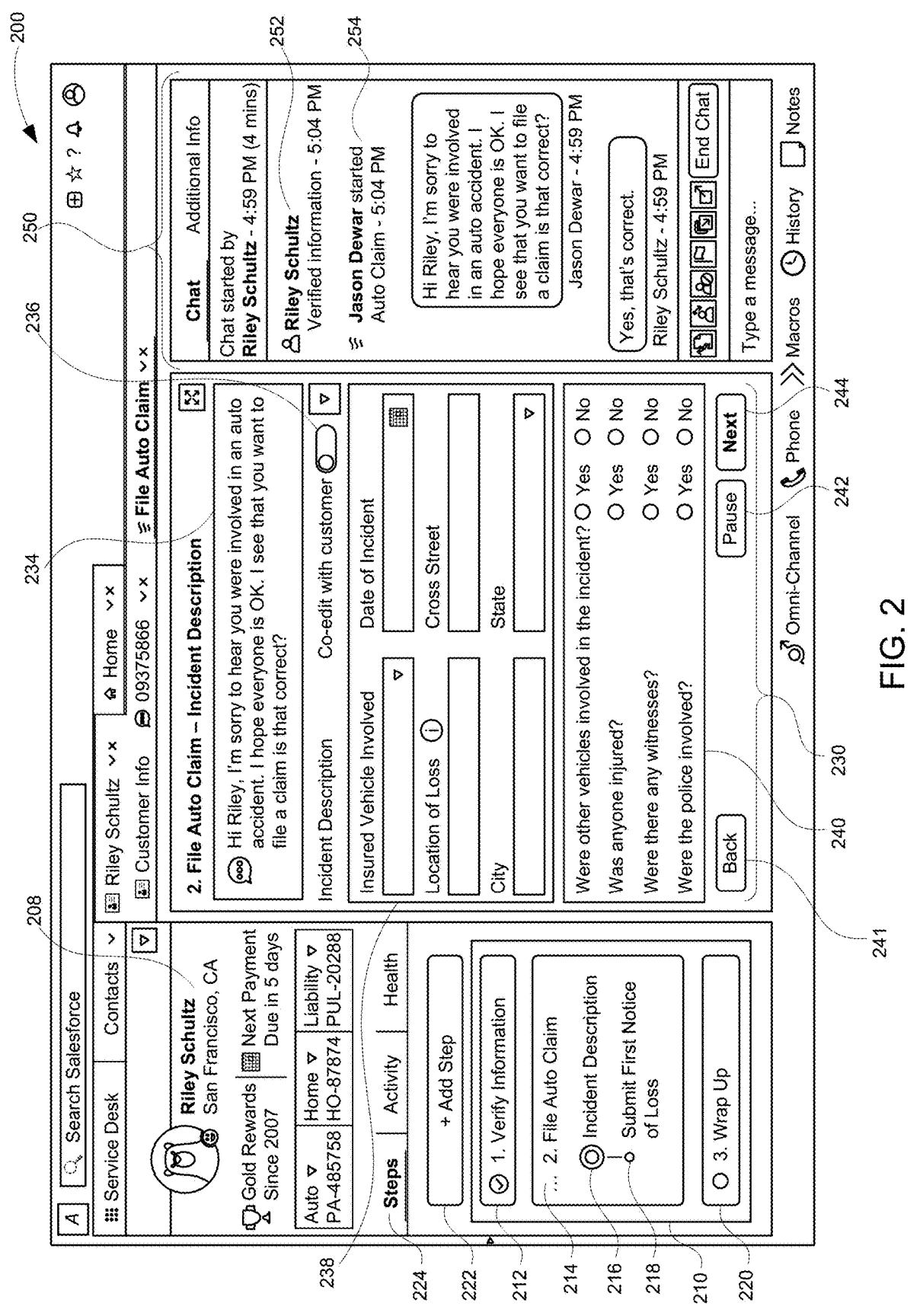

FIG. 2 shows an example of a presentation 200 displayed on a computing device in the form of a graphical user interface (GUI) for maintaining flows to manage support agent tasks in accordance with some implementations. Specifically, presentation 200 illustrates an example of an interface in the Salesforce® Service Console app that helps support agents process the filing of an automobile insurance claim. Riley Schultz is the name associated with a contact record 208 in a database system storing records accessible in presentation 200. Riley is live chatting through chat interactions 250 with a support agent from the AB Insurance Company in order to file an auto insurance claim.

By way of example, AB Insurance Company employs 20 support agents to handle inquiries from insurees about insurance claims. Typically, a support agent handles a case, such as an inquiry from Riley Schultz, in the following way:
1. The communication is routed to the appropriate support agent based on the insurance claim type.
2. Support agent takes basic information about the insuree, such as their name and phone number.
3. Support agent verifies the insurance claim type that the insuree is looking for.
4. Support agent follows a series of steps to process the insurance claim application.
5. When the insurance claim application is processed successfully, the application enters the approval process.
6. When the insurance claim application is approved, the insurance claim is sent for disbursement.
7. Support agent wraps up the insurance claim application.

Cyrus is in charge of the insurance claim application department and is looking at ways to improve support agent efficiency. Cyrus wants to streamline common steps that are applicable to all insurance claim types, and unique steps specific to the insurance claim type. Cyrus also wants an automated way of associating the flows dynamically to a database record. Cyrus approaches Maria, the system administrator for AB Insurance Company, to see if she can introduce changes that can improve the flow creation and management interface to provide increased overall productivity of support agents and give them more flexibility.

Using the disclosed techniques, administrators like Maria can provide a way to preconfigure flows and associate them to newly created records. Specifically, Maria can provide AB Insurance Company support agents with a dynamic set of flows associated to a database record so support agents can see all the flows that need to be completed for the database record upfront, and an easy way for support agents to search for and add more flows.

By way of illustration, Riley's record detail page 206 has an Action List component 210. The Action List component 210 contains three flows, flow 212, flow 214, and flow 220, for the support agent to complete, namely, Verify Information (which has a status of completed as indicated by chat event 252), File Auto Claim (which has a status of in progress as indicated by chat event 254), and Wrap Up (which has a status of not yet started).

Flow 212, flow 214, and flow 220 guide support agents AB Insurance Company through multi-step tasks, like chat interactions 250 or call script 234, in presentation 200 as shown in FIG. 2. When data indicating a support issue is received at a computing device interfaced to, for example, the Salesforce® Service Console, a preconfigured flow can be associated to a new record that is created in response to detecting a new chat interaction or unknown caller, and the preconfigured flow can launch as a primary tab or subtab in presentation 200. For instance, in the center of the page is subtab 204, which provides a flow presentation 230 to the support agent for executing tasks in a flow or tasks in a particular stage of a flow. FIG. 2 illustrates a presentation corresponding to the File Auto Claim flow 214, and specifically for executing tasks defined by flow stage 216 ("Incident Description"). Presentation 200 also allows activating flow pause 242 (such as if there is a timeout error in chat interactions 250), or activating flow forward navigation 244, which transitions presentation 200 to display an interface for tasks relating to Submit First Notice of Loss as defined by flow stage 218. Presentation 200 also allows activating flow backward navigation 241, which transitions presentation 200 to a previous flow or stage of a flow, thereby allowing nonlinear execution of tasks defined by a flow or group of flows.

Presentation 200 can be configured to enable support agents to complete tasks in each flow or flow stage, as indicated by data fields 238 and question fields 240 pertaining to File Auto claim 214. A support agent can add more flows based on the particular circumstances using an Add Step option 222. In some implementations, flows can be packaged and shared, such as, for example, on the Salesforce® AppExchange® or other stores. In certain implementations, a flow can be collaboratively processed, such as by using the Co-edit with customer option 236, which allows, for example, Riley Schultz to fill out entries in data fields 238 in cooperation with a support agent at AB Insurance Company.

It should be appreciated that flow 212, flow 214, and flow 220 can each be generated programmatically (e.g., by code, API, etc.), declaratively (e.g., by clicks in a visual interface, menu selections, etc.), or any combination of the two. In a class of implementations, flow 212, flow 214, and flow 220 are generated in, for example, the Salesforce® Lightning Flow for Service (also referred to as Lightning Guided Engagement) environment, which allows creating customized process flows using clicks, not code. For example, Lightning Flow for Service allows configuration of a Flow Designer to create individual flows that can handle complex branching logic and support UI input.

In some implementations, to handle unknown callers, Maria defines a flow called Contact Create that walks support agents through creating a new contact (e.g., if a record for Riley Schultz did not already exist in the database). It should be appreciated that in some implementations, a flow automatically creates a record (e.g., contact record, etc.) from inputs that the support agent fills in, in contrast to a separate task of creation of a contact record.

Maria also implements logic that can detect that the Contact Create flow does not need to be shown for the scenario depicted in FIG. 2 because Riley Schulz, based on information obtained through the chat channel, is detected to already have a corresponding contact in the database. Furthermore, flows relating to other claim types, such as personal injury claims or medical insurance claims, can be excluded from presentation 200.

In certain implementations, after defining the flows, Maria can create a process for associating the flows, such as Verify Identity, File Auto Claim, and Wrap Up, to one or more data objects (e.g., a contact object) stored in the database.

By way of example, Maria can use Lightning Flow for Service to allow associations between database records and specific flows (e.g., through the configuration of Process Builder® to build processes that establish the association). In some implementations, the process for establishing associations between database records and specific flows uses a point-and-click interface that allows the implementation of processes that initiate when a new or updated record meets specific criteria (i.e., execute actions that are triggered by definable criteria.) In some implementations, multiple flows, if they meet the same criteria, can be associated with a record by one process. For example, an insurance Claim Type is a field that the support agent can enter based on the claim request, which in turn can be used to conditionally associate flows (e.g., via Process Builder, etc.) based on the insurance claim type.

In various implementations, non-click based interfaces can be used to implement the process for associating records and flows. For example, Apex, SOAP, and other programmatic interfaces can be used to associate flows with records using the, as a nonlimiting example, a RecordAction object described in more detail later below. For example, Apex allows freedom in choosing how to trigger the creation of a RecordAction, such as, including but not limited to triggering before a Data Manipulation Language (DML) operation (rather than after), triggering on delete and undelete DML, validating data before an action is run, or custom error handling. As another example, the SOAP (Simple Object Access Protocol) API can be used to programmatically associate flows to records. The SOAP API can be used to create, retrieve, update, or delete a RecordAction object, similar to other standard objects.

Figure 3:
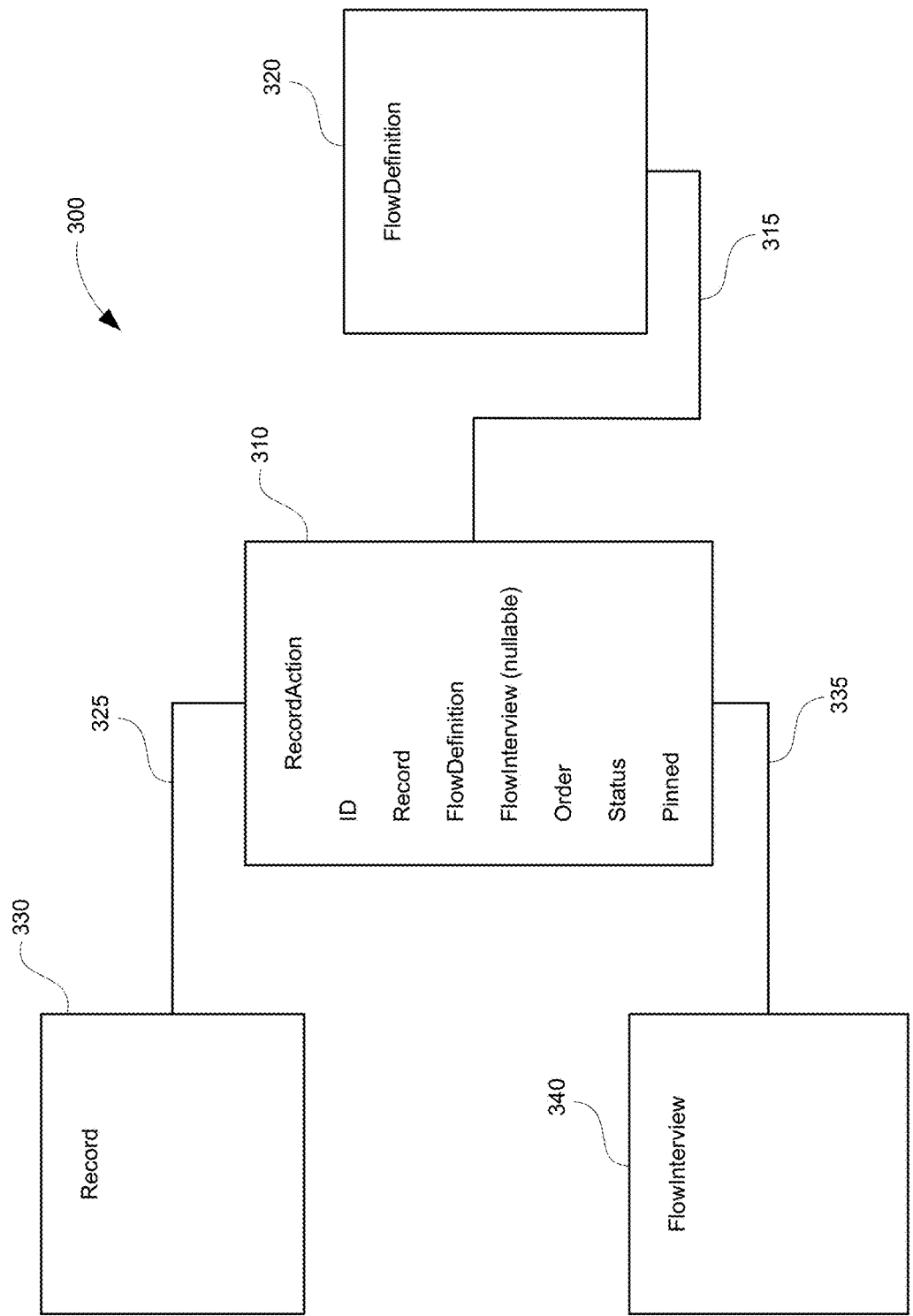
FIG. 3 shows an example of a data model for a junction object 300 for maintaining flows to manage agent tasks assigned to a user of a computing system, performed in accordance with some implementations.

In various implementations, use of a data object referred to herein as a junction object, allows association of database records to flows. By way of illustration, Maria can configure a process that, when triggered, creates a junction object. FIG. 3 shows an example of a data model for a junction object 300 for maintaining flows to manage agent tasks assigned to a user of a computing system, performed in accordance with some implementations. In FIG. 3, the junction object is referred to as a RecordAction object. The junction object allows a flow to be automatically associated with the record that initiated the process. For example, contact record creation can invoke a process based on caller details to generate a RecordAction record linking a flow (e.g., Verify Identity) to the contact record (e.g., the contact record for Riley Schultz). For instance, when a database record such as a contact record is opened and there is an associated flow identified by the junction object record, the flow is launched as a subtab in presentation 200.

It should be noted as referred to herein, a record is an instance of an object (e.g., a contact record is an instance of a contact object, a RecordAction record is an instance of a RecordAction object).

In some implementations, the process creating a junction object also specifies a parent record and flow, as described by a flow definition. When the process is triggered and a junction object is created, the identified flow shows up in, for example, the parent record's Action List component, and is available to be run by, for example, the flow management interface provided to the support agent. It should be appreciated that creating a junction object (e.g., RecordAction object) does not necessarily invoke the flow immediately, as might occur with, for example, processes that are not screen-based. For instance, the creation of the junction object associates a record with the flow so that it can be invoked later by, for example, presentation 200 provided to a support agent.

FIG. 3 provides non-limiting examples of fields in RecordAction 310.

"ID" stores the unique identifier for each instance of the RecordAction object. For example, a first RecordAction record associating the Verify Information flow 212 to the Riley Schultz contact record 208 will have a different ID value for a second RecordAction record associating the Wrap Up flow 220 to the Riley Schultz contact record 208.

"Record" references the parent record, which is an instance of a database object. The disclosed techniques allow a flow to be associated with a variety of database objects, including but not limited to Accounts, Assets, Cases, Contacts, Contracts, Custom objects, Leads, Live Agent Chat Transcripts, Opportunities, Orders, Products, Posts, Tasks, and so forth. For example, a first RecordAction record associates the Verify Information flow 212 to the Record field that references the Riley Schultz contact record 208. In some implementations, the relationship 325 from RecordAction 310 to Record 330 is a many to one relationship (e.g., multiple instances of the RecordAction object can reference the same instance of a record object)

"FlowDefinition" references the metadata that defines a particular Flow. For example, a first RecordAction record associates metadata specifying the tasks within Verify Information flow 212 to the Riley Schultz contact record 208. In certain implementations, the relationship 315 from RecordAction 310 to FlowDefinition 320 is a many to one relationship (e.g., multiple instances of the RecordAction object can reference the same instance of a FlowDefinition object)

"FlowInterview" references information for a paused instance or a running instance of a Flow. For example, for a first RecordAction record associating the Verify Information flow 212 to the Riley Schultz contact record 208, FlowInterview references information about the flow 212 when the support agent indicates to the database system that flow 212 is paused (e.g., a disrupted communication session). In various implementations, the relationship 335 from RecordAction 310 to FlowInterview 340 is a one to one relationship (e.g., one instance of the RecordAction object can reference one instance of a FlowInterview object)

"Order" is a value for the order of the flow associated with RecordAction 410 for display in a component, such as Action List component 210, and corresponds to the order of a particular flow among all flows associated with the same record identified by the Record field (e.g., for the Riley Schultz contact record 208, the Verify Information flow 212 is configured with a value for an earlier position relative to Wrap Up flow 220).

"Status" is a value indicating the state of a flow associated with RecordAction 410 and displayed in, for example, Action List component 210 (e.g., visual indication of whether the flow is a new, paused, or completed flow.

"Pinned" is a value indicating a treatment given to a flow associated with RecordAction 410 and displayed in, for example, Action List component 210, as a top or bottom pinned flow that cannot be removed by support agents (e.g., mandatory verification, security, and Wrap Up flows).

It should be appreciated that features supported by metadata associated with a junction object (including, for example, the RecordAction object) are not limited to the examples disclosed herein. For example, other actions, such as but not limited to Quick Actions, may be supported. It should further be appreciated that fields, or attributes, for a junction object (including, for example, the RecordAction object) are not limited to the examples disclosed herein.

After defining flows and associating flows with database records using, for example, junction objects implemented using the data model illustrated in FIG. 3, a display indicating the status of multiple flows, such as Action List component 210, can be added presentation 200. Action List component 210 can be added to, for example, a Salesforce® Lightning page. Action List component 210 helps support agents identify which tasks to complete using a set of associated flows, pause and restart flows, view the stages in an active flow, and add more tasks or flows. By way of example, Maria adds the Action List component 210 to presentation 200. This component lets support agents see the list of flows defined earlier by Maria, and also lets them add more flows based on the Add Step 222 option. The component displays all new or ongoing flows associated with RecordAction records that are tied to a specific parent record as identified by the "Record" field depicted for RecordAction 310 of FIG. 3. As depicted in Action List component 210 in FIG. 2, the Verify Information flow is In Progress and the Auto Loan and Wrap Up flows haven't been started. By way of example, to perform actions on a specific flow in Action List component 210, support agents can use, for instance, a drop down menu next to each flow. Support agents can take actions including but not limited to: Pause/Resume, Open, Duplicate, or Remove (which removes the flow from the list).

Figure 4:
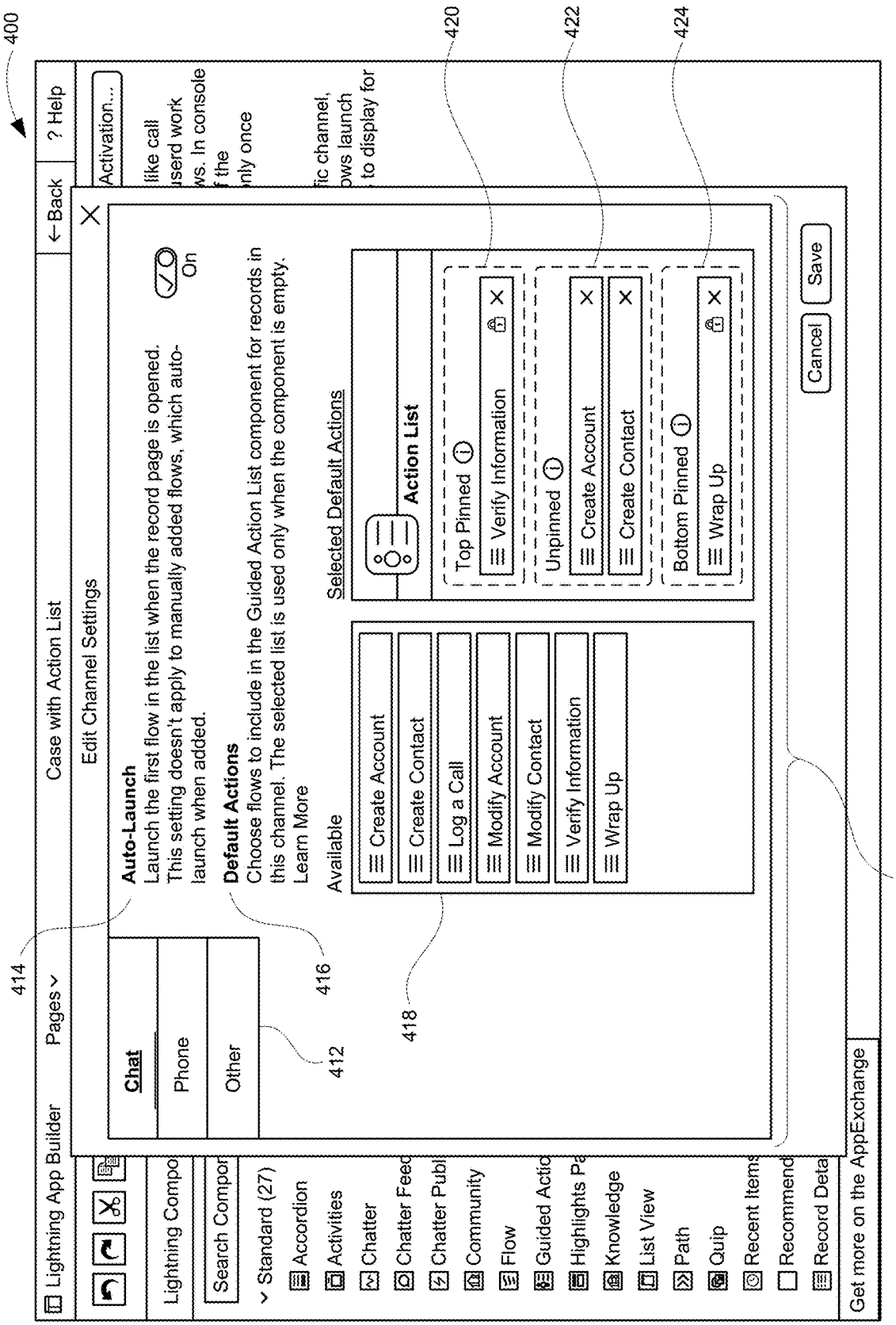
FIG. 4 shows an example of a presentation 400 displayed on a computing device in the form of a GUI for configuring the display of flows to support agents in accordance with some implementations.

FIG. 4 shows an example of a presentation 400 displayed on a computing device in the form of a GUI for configuring the display of flows to support agents in accordance with some implementations.

It should be appreciated that system administrators can use, for example, presentation 400 to configure presentation 200 and/or Action List component 210 to be provided in a variety of navigation formats. As one example, flows can be presented for console navigation formats that allow opening multiple database records at a time, and related database records open in subtabs under the original database record, thereby allowing a split view. In another example, presentation 200 can be provided for apps with a navigation format that allows opening a single record at a time.

In certain implementations, flows can be configured to auto-launch in presentation 200, such as by enabling the Auto-Launch option 414 depicted in FIG. 4. For example, the first flow in Action List component 210 is auto-launched when the agent opens the record page. In some implementations, such as, but not limited to apps with standard navigation, flows can be configured to not be auto-launched, thereby ensuring that support agents see a record's details before launching a flow.

By way of example, Salesforce system administrators can configure the Action List component based on the channel, or source, of a customer interaction. For example, an administrator can set up Flow auto-launching and default Flows for the Action List based on the particular channel type (e.g., Chat, Phone, Other) included in channel options 412. Default flows 416 are flows that automatically populate the Action List when a support agent begins a customer interaction using a particular channel type. Flows from default flows 416 are selected from available flows 418. Presentation 400 allows certain flows in default flows 416 to be pinned flows. Pinned flows reside at the top (e.g., flow 420) or at the bottom (e.g., flow 424) of the Action List and must be completed by the support agent (e.g., mandatory flows). Unpinned flows 422 include flow(s) that may be removed if deemed not relevant to the particular scenario being handled by support agent. It should be appreciated that default flows 416 provides a standard set of flows for a particular communication channel, and furthermore, the pinned flows (e.g., flow 420 and flow 424) identify mandatory flows, and each of these features increases uniformity across different users of presentation 200.

Figure 5:
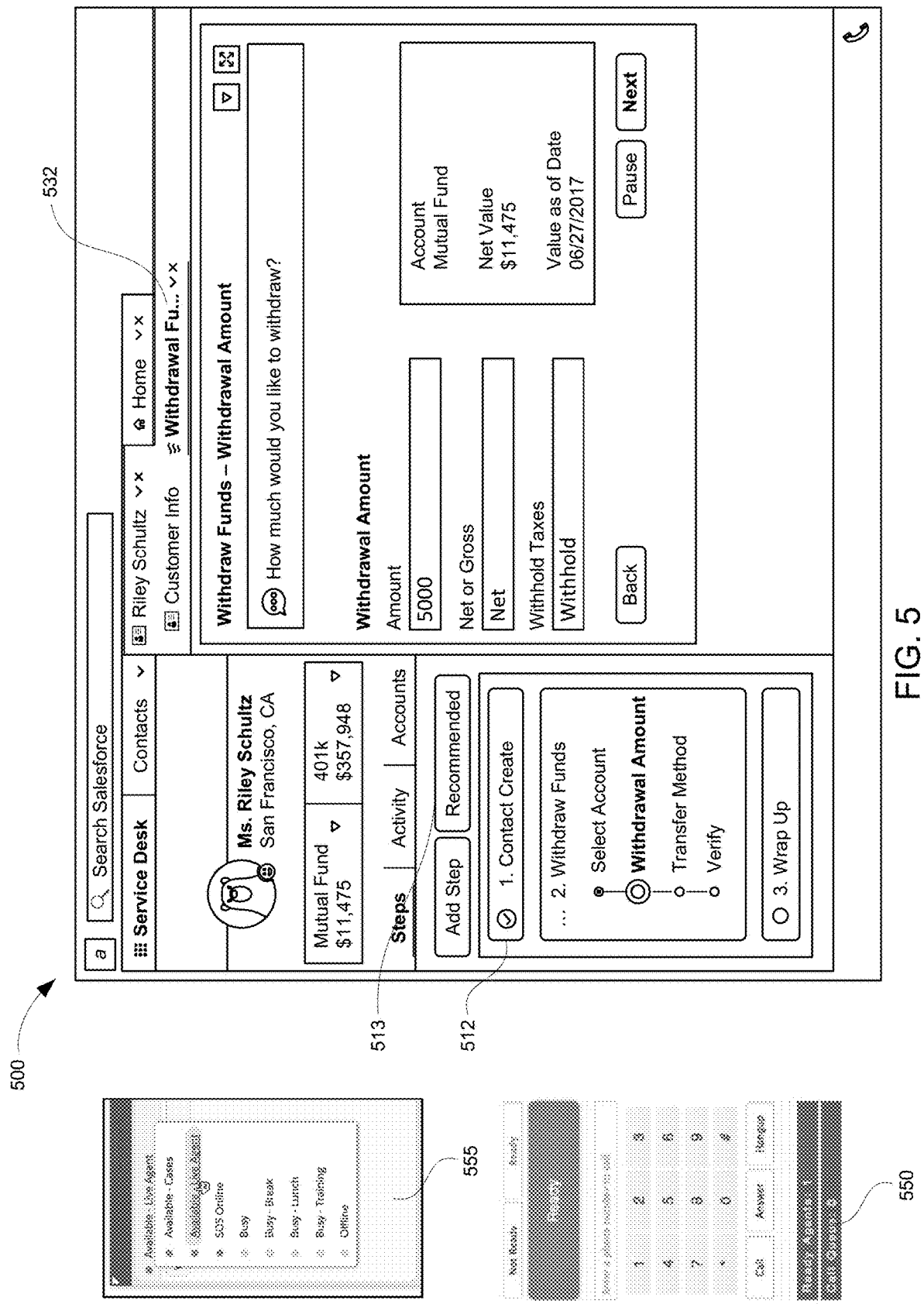
FIG. 5 shows an example of a presentation 500 displayed on a computing device in the form of a graphical user interface (GUI) for maintaining flows to manage agent tasks in accordance with some implementations.

FIG. 5 shows an example of a presentation 500 displayed on a computing device in the form of a graphical user interface (GUI) for maintaining flows to manage agent tasks in accordance with some implementations.

In certain implementation, flows in Action List component 510 can be integrated with telephony features. For example, Maria can set up a flow management platform (e.g., Lightning Flow for Service, Lightning Guided Engagement, etc.) to work with a phone integration platform 550 supporting unknown callers and known callers (e.g., Open CTI, etc.), and/or a chat integration platform 555 supporting live or autonomous chat (e.g., Live Agent, etc.).

By way of example, Maria can configure the interaction of flows with specific parameters for a communication channel (e.g., phone, chat, email, etc.). For example, Maria can define flows related to the phone communication channel by updating the Screen Pop Settings for a softphone layout depicted in phone integration platform 550. Specifically, to handle unknown callers, Maria updates, for example, a No Matching Records setting to pop to an unknown caller flow, Contact Create 512, that she previously defined. This ensures that when a support agent accepts a call from an unknown caller who wants to, for example, withdraw funds from a bank account, presentation 500 automatically presents a flow to create a new contact record using the Contact Create 512 flow.

Open CTI is a nonlimiting example of a set of APIs that enable third-party telephony services to integrate with the disclosed flow management interface. By way of example, Salesforce® Lightning Flow for Service provides, for example, one or more API calls such as but not limited to getSoftphoneLayout( ), screenPop( ), and searchAndScreenPop( ) that can be utilized to implement a pop to flow option.

In some implementations, phone integration platform 550 enables an incoming call to screen-pop (i.e., automatically launch/display tab 532 in presentation 500) a flow (e.g., Contact Create 512). Additionally, call data, such as a phone number or name, can be passed directly into the flow when the flow is screen-popped (e.g., auto populate a phone number and name data entry field).

Information associated with a channel, such as a phone number, can also be used to query a database. For example, a phone number can be configured to, based on various search match conditions (e.g., no match, single match, and multiple match), pop to one or more flows.

In some implementations, flows have the ability to accept input variables, which are also referred to herein as arguments. The Action List component on a record page can be configured to automatically attempt to pass the parent record ID identified by a field in, for example, RecordAction 310, to the flow. In order to make use of this information, the flow can define an input variable called recordId of type Text. By way of illustration, based on database search match conditions, arguments can be passed to the flow (e.g., as variables defined inside the flow), for example, the caller's phone number or a list of matching records. It should be appreciated that more complex variable can be passed from general information to a flow, including but not limited to single variables and collection variables, like lists and arrays.

In some implementations, Maria also adds a recommended flow option 513 to presentation 500 to enable requesting of a display of recommended flows to support agents. The recommendation engine can be based on historical actions performed by support agents for similar contexts, semantic processing (e.g., text processing of an email or chat transcript, etc.), or an interface to a recommendation platform (e.g., Salesforce® Einstein Next Best Action, etc.).

In accordance to some implementations, a database record such as a contact can be shared such that the contact can be viewed or edited by different users of a database system. A database record for a flow can also be shared. However, unlike a static database record such as a contact, a flow represents an action, such as executable logic that can be paused at different points throughout the execution. The sharing of flows, in contrast to sharing a database record such as a contact, requires consideration of user specific constraints that are implicated by the executable logic.

One example of a user specific constraint includes different database read, write, and/or modify privileges. For instance, if a user does not have privileges to delete the flow interview record that stores the state of a flow, which in some implementations is required when resuming a paused flow interview, proper flow execution is impeded. In certain implementations, the database system is configured to perform a temporary push/pull of access rights (e.g., temporarily provide delete privileges, than remove the privilege).

Another example of a user specific constraint includes reconciling the user context. For instance, if flow execution logic creates or modifies a database record, such operations should be attributed to the user that the paused flow is being handed off to, in contrast to the creator.

A further example of a user specific constraint includes flow execution logic that is dependent on the particular user context. For instance, a particular branch of the flow execution logic may be available to a manager (e.g., authorized to provide a discount on a product) but unavailable to a subordinate (e.g., not authorized to provide a discount).

The ability to share flows, despite the added complexity associated with sharing executable logic relative to static data such as a phone number, improves the usability, and thus the performance, of a computer having a multi-tenant database system. In systems where certain users have been given the privilege to manage flows (e.g., access information regarding the status of the flow, time of creation, user attribution, etc.), such 'Manage Flow' permissions do not necessarily give a user access to all database system operations relating to flow interviews, and therefore such users may not be able to resume paused interviews unless they also have edit access to the interview. For example, users with 'Manage Flow' permissions (e.g., a system administrator, etc.) may be able to perform a SOQL Query to verify existence of, for example, FlowInterviewShare records indicating criteria for sharing a particular flow interview record, and can also view pages listing paused and waiting flow interviews, including entries that give the reason for sharing access (e.g. Rule, Owner, Manual). However, in certain implementations, despite having visibility to all records in the database, even the system administrator may be unable to resume paused flows created by a different user. For example, further requirements to resume paused interviews include one or more of having run flows permissions, a flow user feature license, along with edit access to the interview via one or more of owner rights, view all data rights, sharing rights, role hierarchy, or organizational-wide sharing defaults. Without the granularity to share paused flows among users, a system might establish functional user accounts, where the functional users are shared to operate these flows, thereby creating inefficiencies in managing user profiles.

The disclosed techniques for flow hand off allows paused flows to be shared among a set of users using sharing rules that will give access to them to resume paused flows. For example, the disclosed techniques enable users who are not the interview owner or a flow admin to resume flows that they did not start. In some implementations, flow sharing can include one or more of the features of owner based sharing of flow interviews, criteria based sharing of flow interviews, the ability to resume flow interviews that a non-owner, non-admin has edit access to, and an organizational preference to enable/disable such flow interview sharing behavior. The enabling/disabling of flow interview sharing can be implemented in environments such as, for example, Service Cloud Console, by configuring security controls, process automation settings, and/or SOAP/Rest API commands.

Figure 6A:
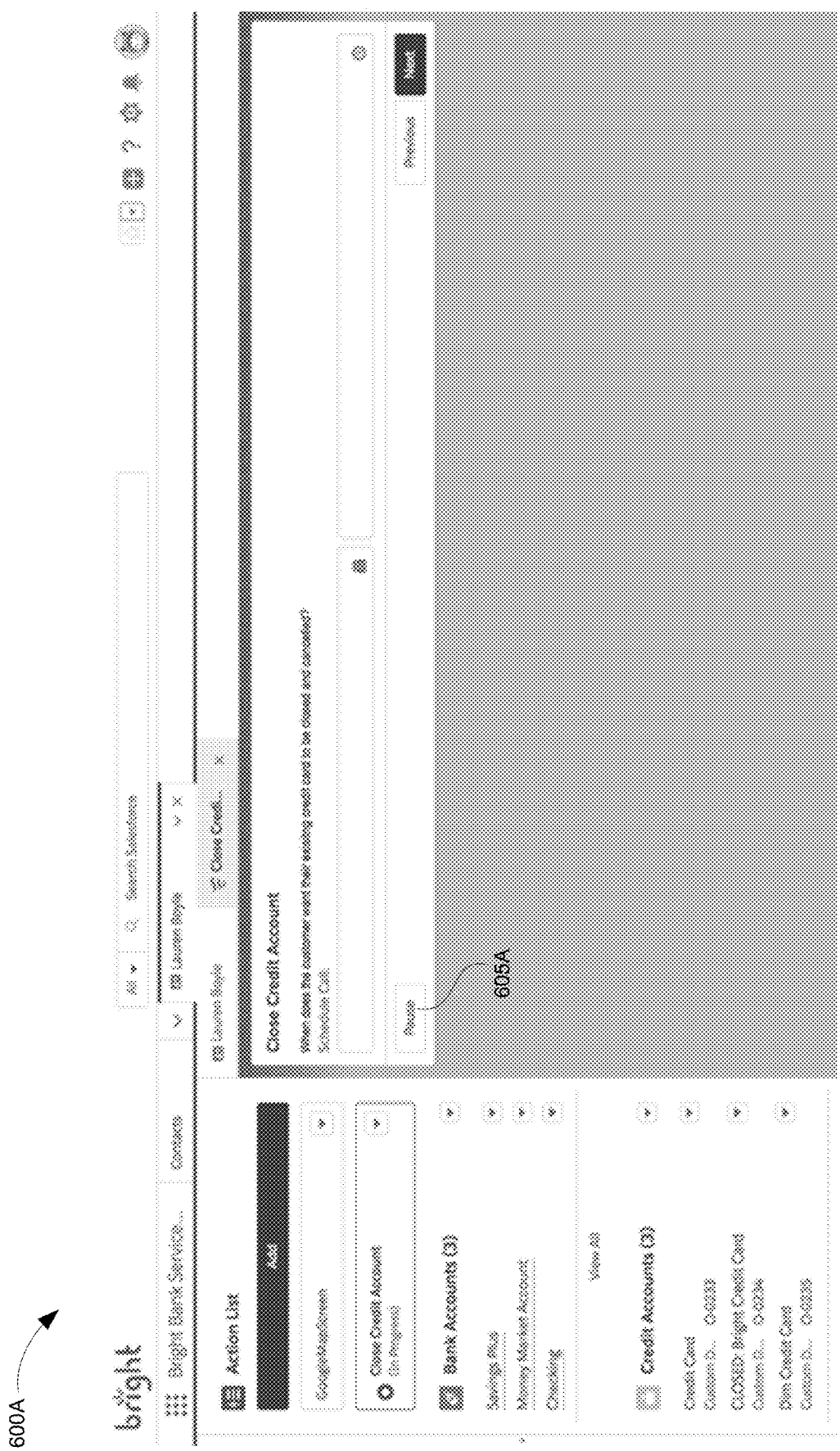
FIG. 6A shows an example of a presentation 600A displayed on a computing device in the form of a graphical user interface (GUI) for pausing flows in accordance with some implementations.

FIG. 6A shows an example of a presentation 600A displayed on a computing device in the form of a graphical user interface (GUI) for pausing flows in accordance with some implementations. Presentation 600A provides an example interface for an agent to assist a customer closing a credit account. As part of the presentation, the agent has an option 605A to pause the flow execution logic for closing the credit account for the particular customer, Lauren Boyle.

Figure 6B:
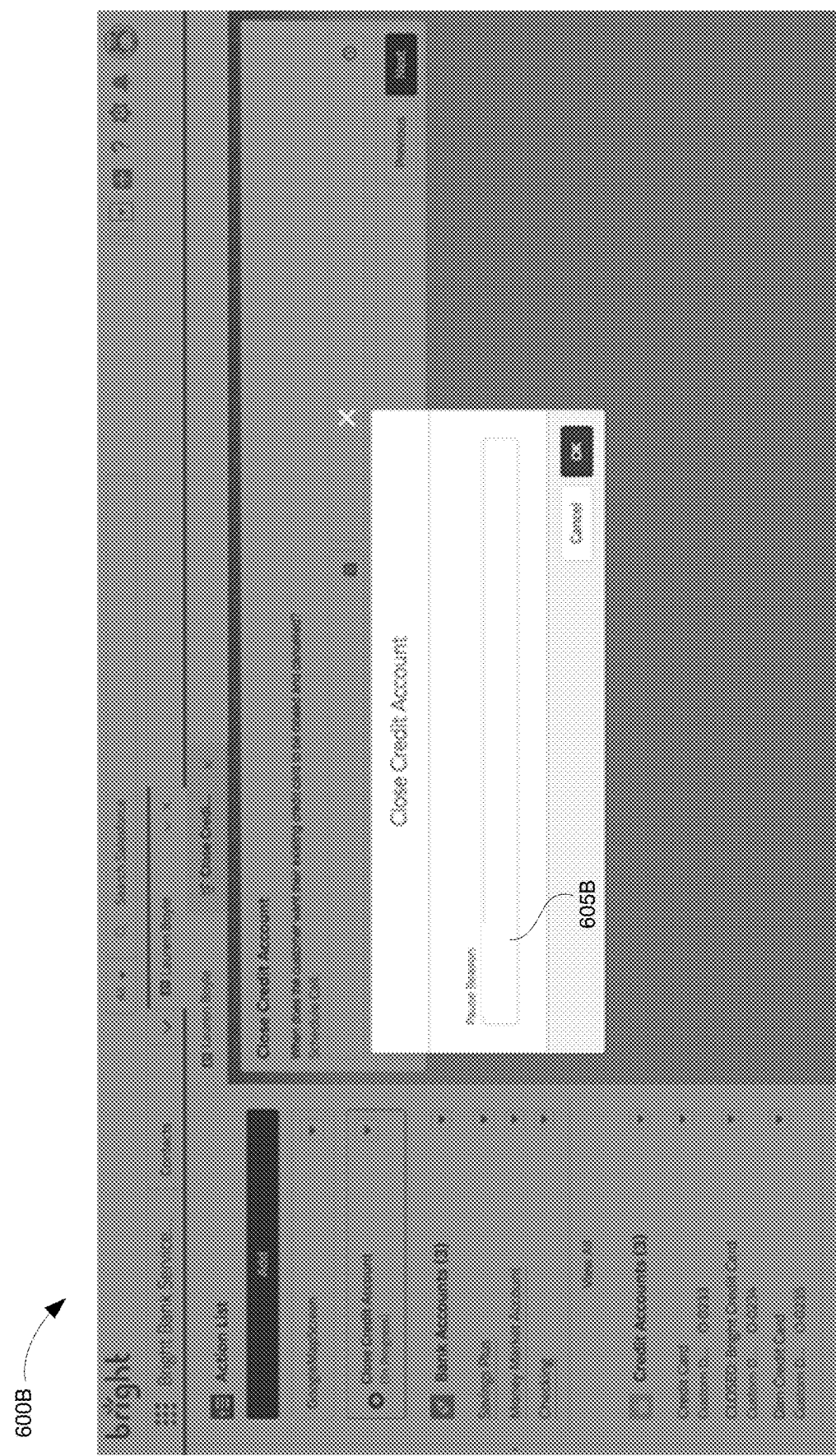
FIG. 6B shows an example of a presentation 600B displayed on a computing device in the form of a graphical user interface (GUI) for pausing flows in accordance with some implementations.

FIG. 6B shows an example of a presentation 600B displayed on a computing device in the form of a graphical user interface (GUI) for pausing flows in accordance with some implementations. In some implementations, in response to the selection for pausing flow execution logic, the presentation 600B can include an option 605B to enter a reason for pausing the flow interview, such as but not limited to being disconnected from a phone call, or lacking the authorization to perform an action requested by the customer.

Figure 6C:
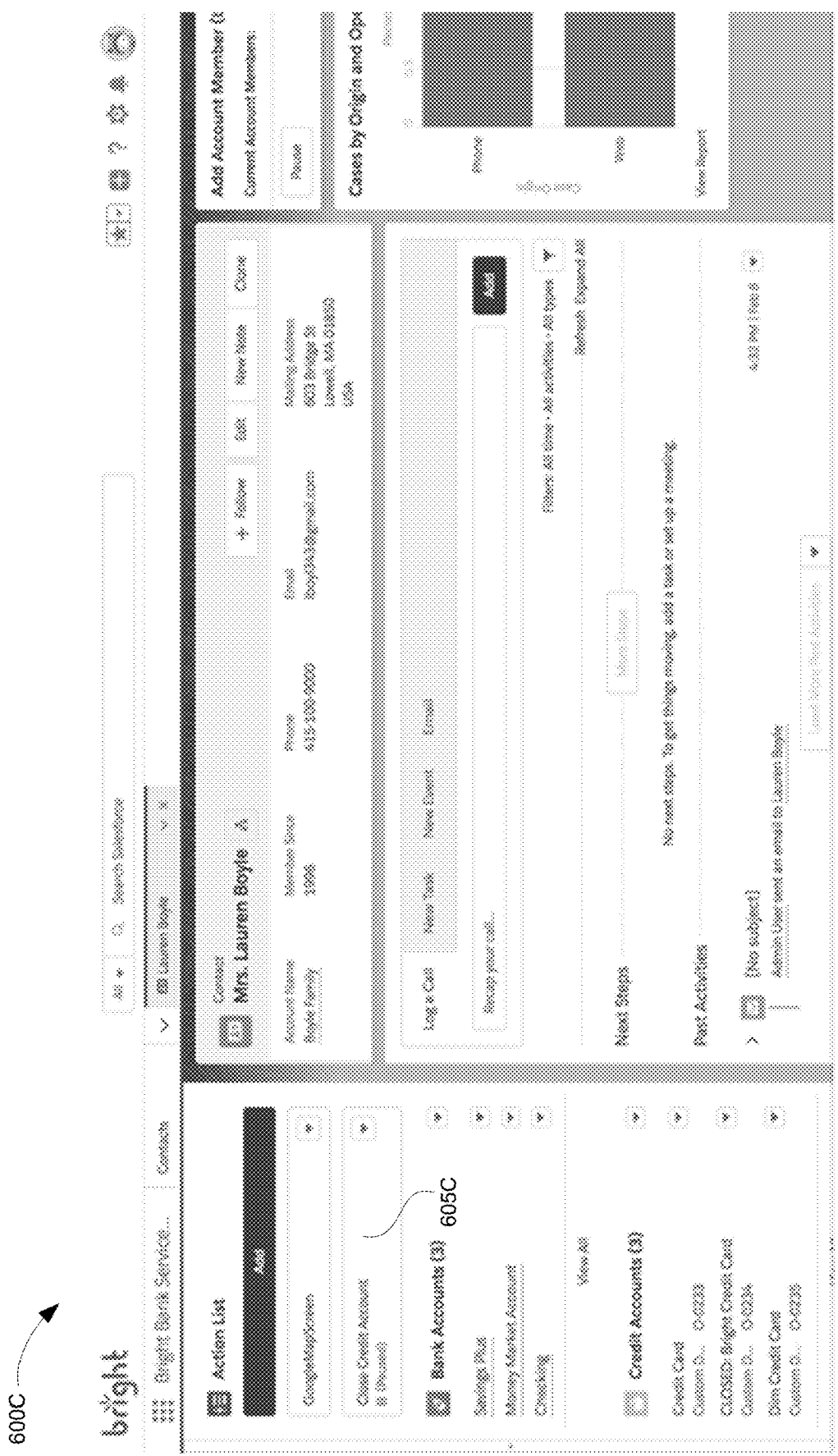
FIG. 6C shows an example of a presentation 600C displayed on a computing device in the form of a graphical user interface (GUI) for resuming flows in accordance with some implementations.

FIG. 6C shows an example of a presentation 600C displayed on a computing device in the form of a graphical user interface (GUI) for resuming flows in accordance with some implementations. In certain implementations, presentation 600C can display information on one or more paused flow interviews in paused flow display portion 605C. For example, the display portion may provide information such as but not limited to the reason for pausing the flow interview, the date/time of pausing, and which step in the overall flow execution logic the flow is being paused at.

Figure 6D:
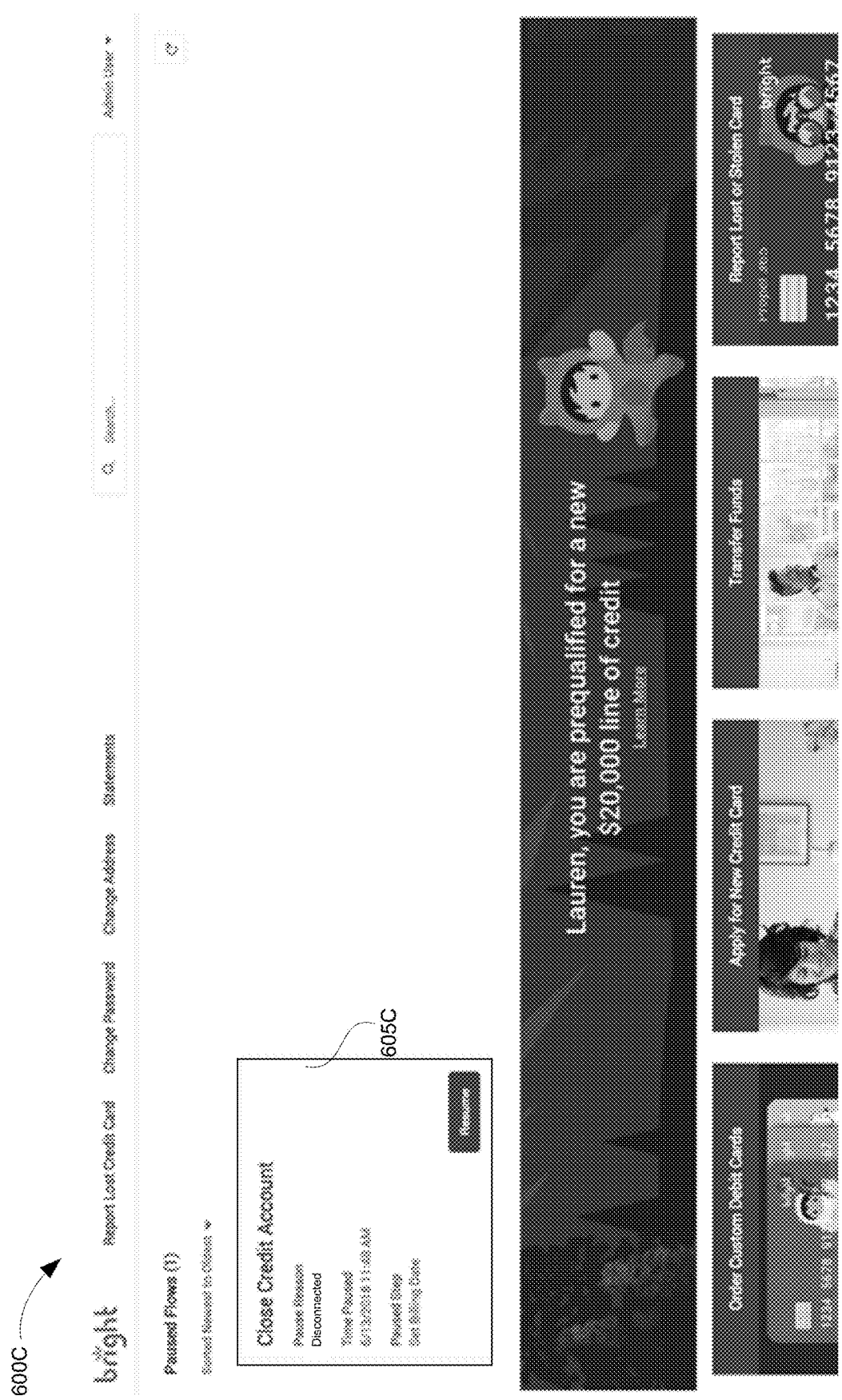
FIG. 6D shows an example of a presentation 600D displayed on a computing device in the form of a graphical user interface (GUI) for managing flows in accordance with some implementations.

FIG. 6D shows an example of a presentation 600D displayed on a computing device in the form of a graphical user interface (GUI) for managing flows in accordance with some implementations. In various implementations, a paused flow can be resumed in variety of ways. For example, rather than navigating to a paused flow display portion, the action list component in presentation 600D can include an option 605D for resuming a paused flow interview for the contact identified as Lauren Boyle.

Figure 7A:
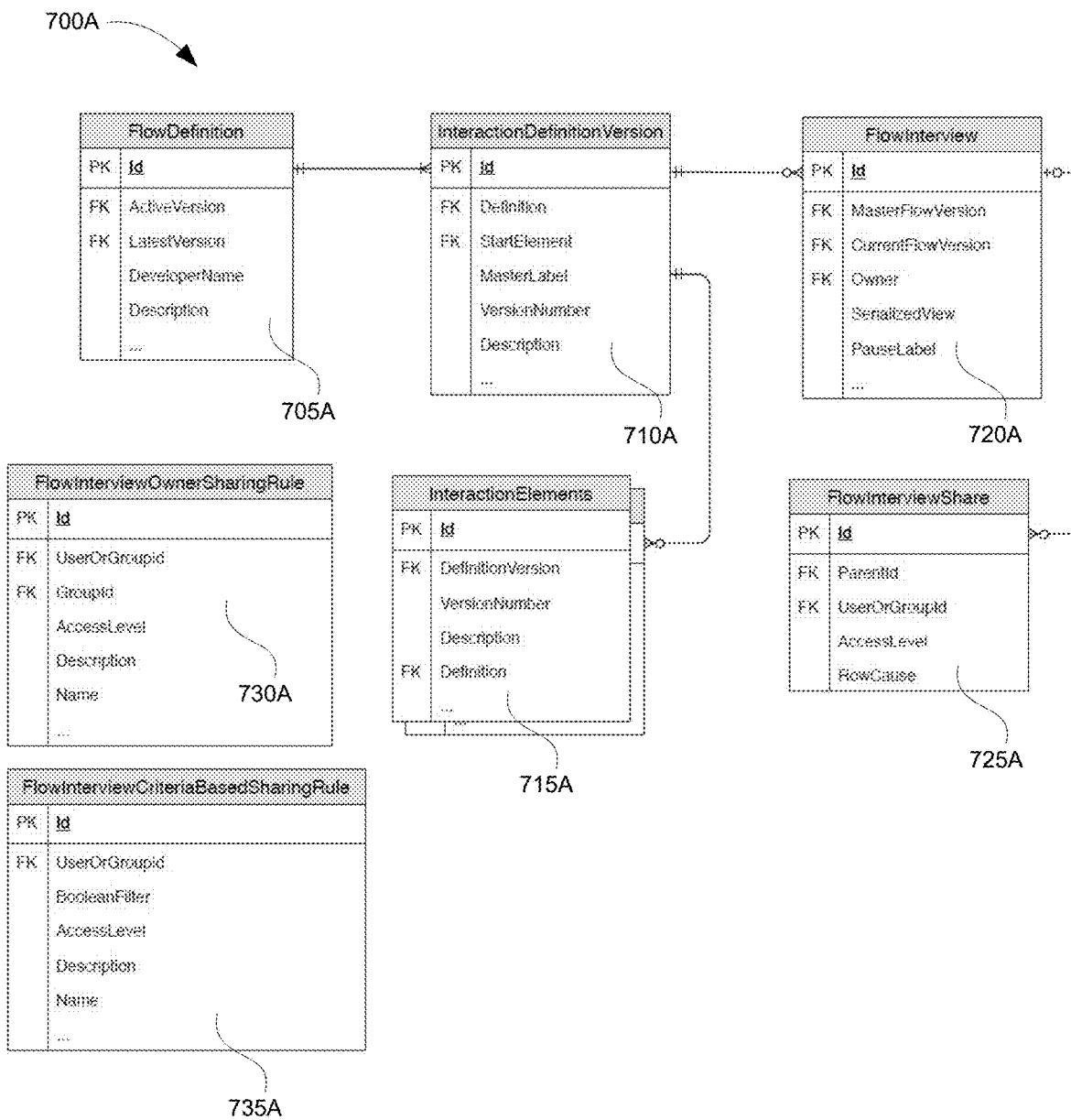
FIG. 7A shows an example of a data model 700A for sharing flows in accordance with some implementations.

FIG. 7A shows an example of a data model 700A for sharing flows in accordance with some implementations. Non-limiting examples of database records involved in certain implementations of sharing running instances of flows, along with examples of fields in the records, are described as follows in relation to FIG. 7A.

FlowDefinition 705A is the parent entity for a set of Flow versions. A flow is an application built by, for example, a Salesforce administrator that asks the user for inputs and executes logic that includes performing operations in, for example, a database system based on those inputs. In some implementations, a flow is represented by metadata that describes how the particular flow will behave when executed. For instance, the metadata for a flow can be saved and associated with a button in a graphical user interface for managing flows. It should be appreciated that sharing flow metadata and related information (e.g., sharing metadata about a flow, when a flow was created, etc.) is distinguishable from sharing running instances of flows (e.g., sharing the execution of the logic identified by the flow metadata).

InteractionDefinitionVersion 710A is a particular version of a FlowDefinition, and is also referred to as a Flow or Flow Definition Version.

InteractionElements 715A is a representation in this diagram for the various elements that make up a flow. Examples of concrete elements are InteractionLoop, InteractionStatement, InteractionWait, InteractionCondition, InteractionConnector, etc. Each of these elements enable, for example, some functionality in the Flow and have associations with the flow definition version.

FlowInterview 720A is a running instance of the execution logic identified by the metadata for a particular flow. In certain implementations, each running instance of a flow has its own flow interview ID and a state for the execution logic. The flow interview can also store data has been entered during the course of the execution of the flow, such as, for example, a phone number or bank account number that has been entered. When a database record is accessed as part of the execution of the flow, the record ID of the accessed data record can also be stored in the flow interview. A FlowInterview can be paused at which point all of its state is persisted. This persisted state is also referred to as a flow interview and is captured in, for some implementations, the SeriaizedView property of the FlowInterview entity.

FlowInterviewShare 725A represents a sharing entry for a FlowInterview which provides access to the FlowInterview record.

FlowInterviewOwnerSharingRule 730A represents rules for sharing a FlowInterview based on who owns the FlowInterview record.

FlowInterviewCriteriaBasedSharingRule 735A represents rules for sharing a FlowInterview based on the properties of the FlowInterview record. For example, sharing the FlowInterview with a group of users if the PauseLabel contains a specific string.

Sharing rules allow a user to access a database record that they do not own or did not create. One example of a sharing rule is a default for sharing across an organization. For instance, for a personalized medicine company, the default may be that database records are not shared between users. As another example, for an aquarium supplies sales company, the default may be that all database records are shared amongst different sales groups. Another example of a sharing rule is a hierarchical system. For instance, the hierarchical rules may specify that superiors have access to records created by a particular user, but subordinates in the hierarchy do not have sharing access. Additional examples of sharing rules are discussed as follows. It should be appreciated that each of the sharing rules described in the present application can be applied independently or in combination with any other of the sharing rules discussed.

Figure 7B:
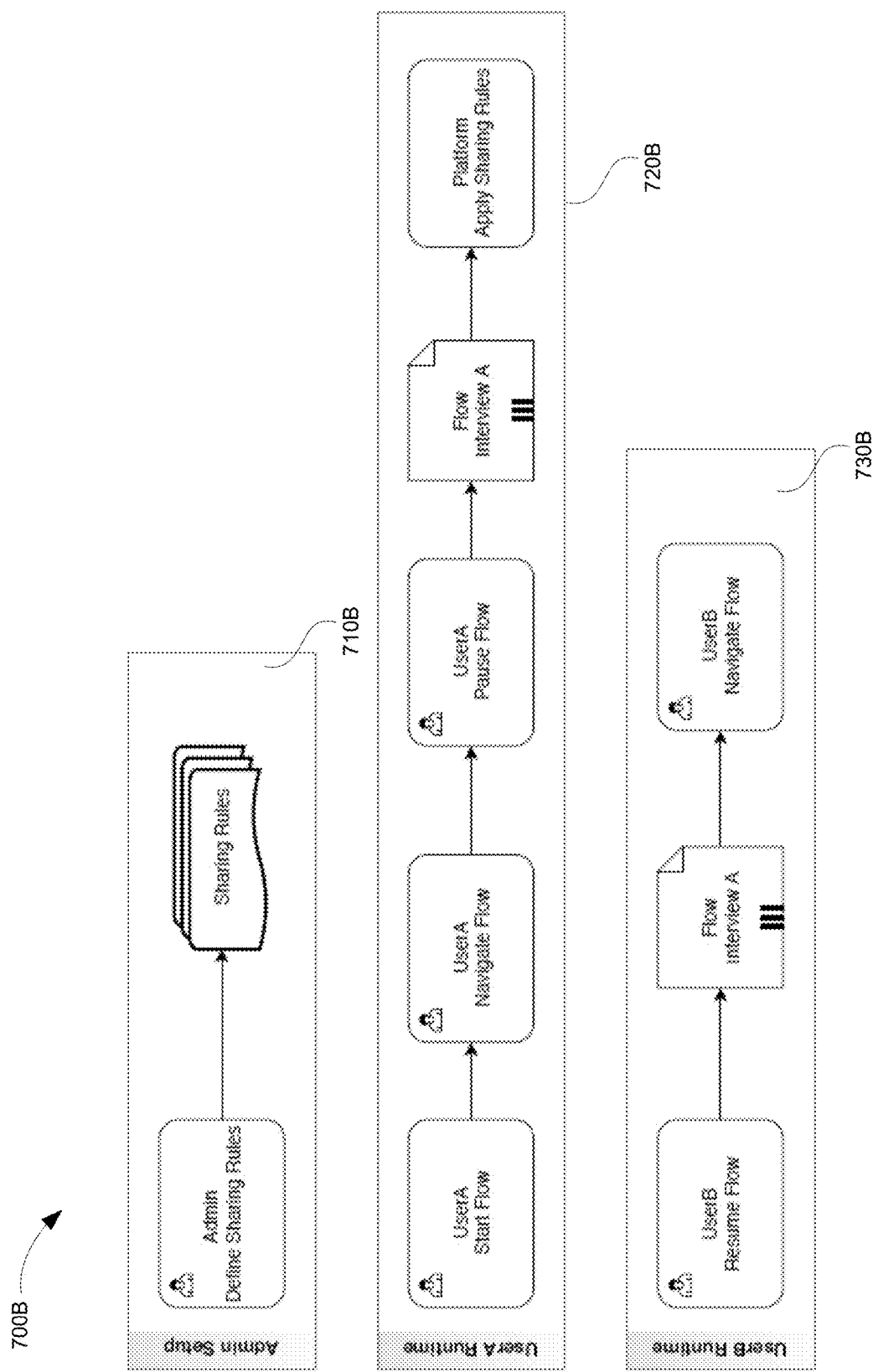
FIG. 7B shows a flowchart of an example of a computer-implemented method 700B for sharing flows in accordance with some implementations.

FIG. 7B shows a flowchart of an example of a computer-implemented method 700B for sharing flows in accordance with some implementations.

In the example flowchart 710B, an administrator of an organization defines one or more sharing rules for a FlowInterview. These rules can be owner based or criteria based. For example, whenever an interview owned by UserA is persisted, share that interview with members of Group 1. Another example is whenever an interview is persisted and its label contains the string "Red Team", share that interview with members of the group Red Team.

In the example flowchart 720B, UserA runs a Flow. Before the user gets to the end of the Flow, she pauses the running interview which persists a FlowInterview record. The sharing rules that were setup by the admin are applied to this new FlowInterview record and grant access to users belonging to groups specified in the applicable sharing rules. UserB, a member of a group that is the target of one of the sharing rules is granted access to the FlowInterviewRecord.

In the example flowchart 730B, UserB can now view and resume the paused Flow interview because he was granted access to the FlowInterview record by the sharing rule.

Figure 7C:
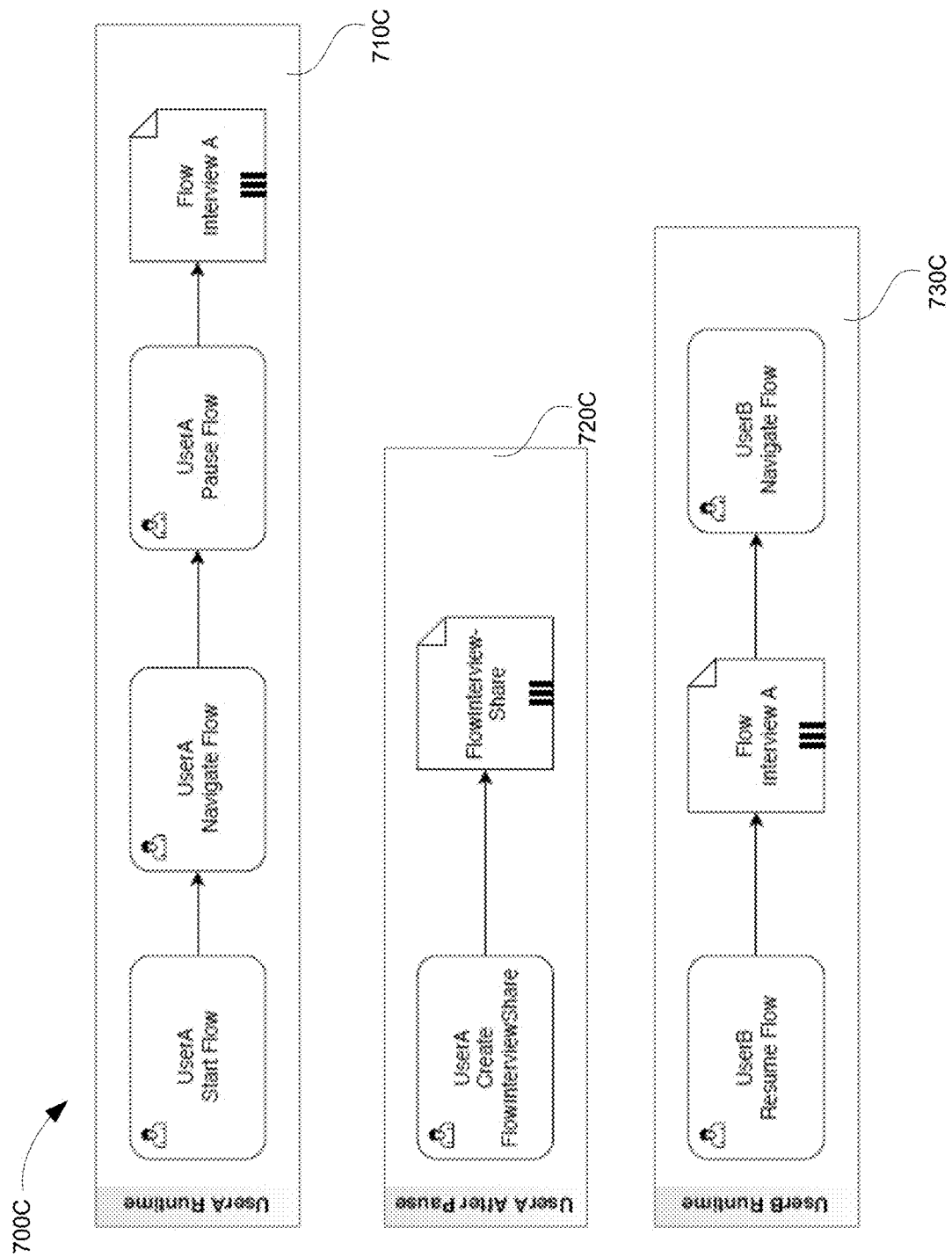
FIG. 7C shows a flowchart of an example of a computer-implemented method 700C for sharing flows in accordance with some implementations.

FIG. 7C shows a flowchart of an example of a computer-implemented method 700C for sharing flows in accordance with some implementations.

In certain implementations, a particular flow interview can be shared separately or in combination with pre-defined sharing rules, such as rules based on organizational defaults, hierarchy, ownership, or specified criteria. Instead, the database system can be configured to directly create a flow interview share record that specifies, for example, a flow interview record ID, user ID, group ID, edit access level (e.g., read only, read and write, etc.), and reason for sharing. For example, a user can create a button in an action list indicating "Share This Flow," which upon selection would create a flow interview share record for a particular flow interview identified by the flow interview ID.

In the example flowchart 710C, UserA runs a Flow. Before the user gets to the end of the Flow, she pauses the running interview which persists a FlowInterview record. The sharing rules that were setup by the admin are applied to this new FlowInterview record and grant access users belonging to groups specified in the applicable sharing rules. UserB, a member of a group that is the target of one of the sharing rules is granted access to the FlowInterviewRecord.

In the example flowchart 720C, after the interview is paused, UserA creates a FlowInterviewShare record (such as with a "Share This Flow" button, or through API calls, Apex calls, etc.) specifying the FlowInterview Id, UserB's Id, and edit access.

In the example flowchart 730C, UserB can now view and resume the paused Flow interview because he was granted access to the FlowInterview record by FlowInterviewShare record.

Figure 7D:
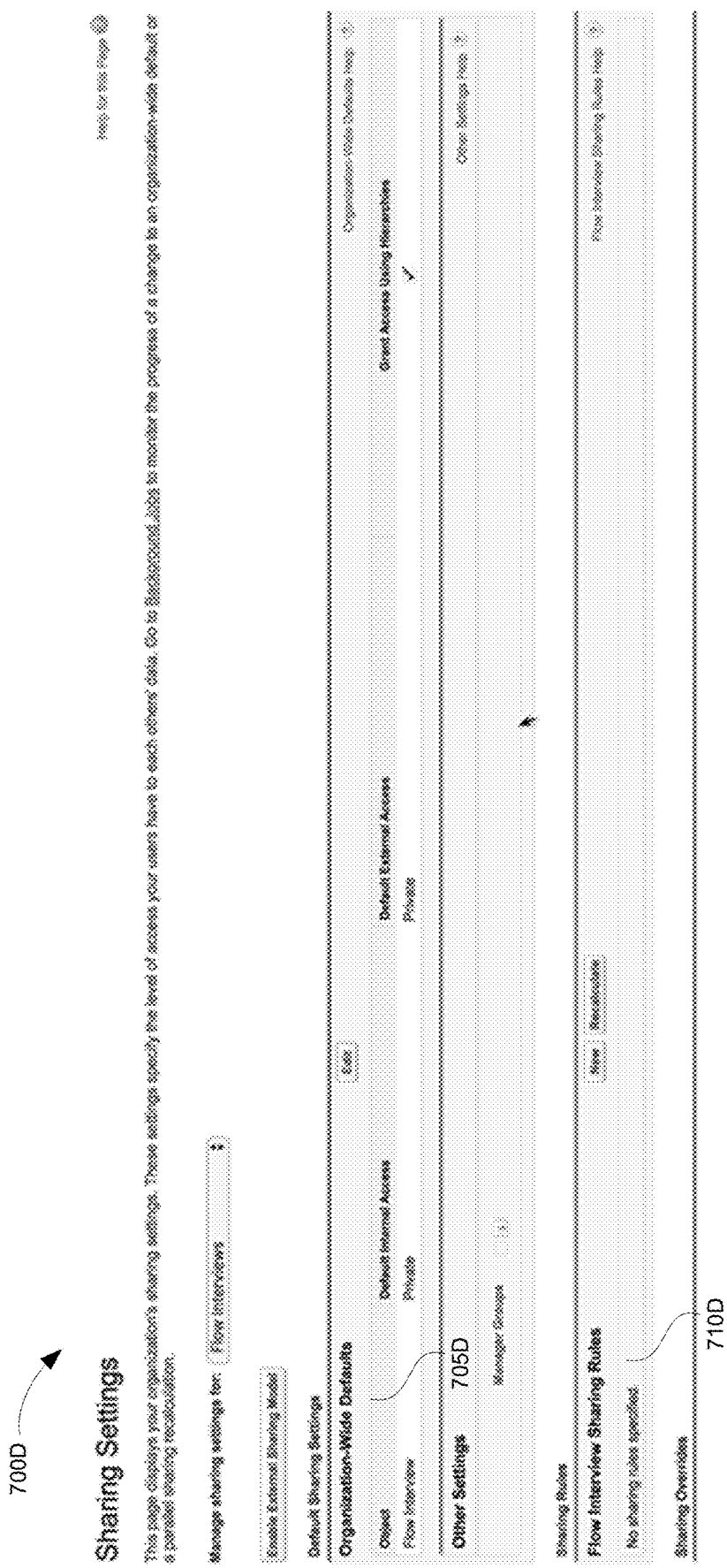
FIG. 7D shows an example of a presentation 700D displayed on a computing device in the form of a graphical user interface (GUI) for configuring rules for sharing flows in accordance with some implementations.

FIG. 7D shows an example of a presentation 700D displayed on a computing device in the form of a graphical user interface (GUI) for configuring rules for sharing flows in accordance with some implementations. Presentation 700D provides an example interface for an admin to configure sharing rules. As part of the presentation, the agent has an option 705D to configure sharing rules based on organization wide defaults, as discussed previously in further detail. The presentation also includes but is not limited to an option 710D to configure sharing rules based on the flow interview share record rules, as discussed previously in further detail.

The behavior of a flow can be configured by, for example, programmatically or declaratively using drag-and-drop tools to define execution logic with multiple steps. Thus, in contrast to a static data record, such as a record storing a phone number, a record storing a flow involves a continuum of execution logic that can exist at different states corresponding to the overall lifecycle of a flow (e.g., from starting the flow to completing the flow).

It should be appreciated that in some implementations, just configuring sharing rules for a flow interview would not necessarily result in proper execution of a flow when being resumed by a different user. For example, in certain implementations, when allowing a user who did not create the flow to be able to resume the paused flow, flow execution logic is configured to check for proper access rights, and/or check for user context considerations, as discussed further as follows.

In some implementations, for a given record, there may be default profile-based access (i.e., whether a user can read/write/update, etc. a particular record). In certain implementations, separate from default profile-based access, the record itself may have access restrictions. Whether access rights are derived from profile-based access or record-based access, or some combination, implementations enabling a user to resume a paused flow involves configuring access rights.

In some implementations, flow interview execution is implemented such that there is no duplication of a flow interview record. (i.e., a duplicate instance is not created). For instance, when a paused flow interview is being resumed, the database record representing the paused flow interview will be deleted. This allows the execution logic corresponding to the flow definition associated with the particular paused flow interview to be re-executed to account for any changes to records in a database system that have occurred between the time of pausing and the time of resuming the flow. For example, a bank account balance may have changed in the interim, so the execution logic is refreshed by deleting and re-creating the flow interview record such that the most up-to-date bank account balance value is utilized.

It should be appreciated that if the record itself does not allow deletion, then a user who created the record may be prevented from sharing the ability to delete the record. In certain implementations, sharing the delete rights would fail because deletion is not allowed and because of the inability to share more than the access rights possessed. As another example, if a standard user profile cannot delete a flow interview, a user configured with the standard user profile that is attempting to resume the flow interview will be unable to delete the paused flow interview record. In either or both cases, proper execution of the resumed flow is impeded.

In some implementations, sharing flow interviews involves temporarily pushing full system access (or a subset of full system access) to a user resuming a flow interview, and then removing certain rights once the flow interview is resumed.

An example will be instructive. For instance, if a bank account number is entered as part of flow interview execution, a flow interview record created by a first user will store the bank account number. Specifically, the serialized state of the running flow interview (e.g., a blob of all assignments, records, etc.) can store the information needed to re-create the state arising from the flow interview execution logic. When paused, a field in the flow interview record can be configured to indicate the paused state. When resuming a paused flow interview, the information stored in the serialized state is used to resume the state of the flow execution logic up to the point of pausing (e.g., to ensure the display for the graphical user interface is up to date, etc.), and the paused flow interview record is deleted because it is obsolete. It should be appreciated that in some implementations if the flow is paused again, a paused version of the flow interview is created again.

A flow execution engine in the database system can determine if a second user is resuming a paused flow interview. If so, the database system can be configured to determine if the second user resuming the paused flow interview is an admin, an owner or creator of the flow interview, or has been identified as a user with edit access. If resuming a paused flow interview based on edit access (e.g., a non-creator of the flow interview), the flow execution engine can push access rights, for example, to allow deletion of the paused flow interview, for proper resuming of execution logic by the second user. Once resumed, deletion rights can be pulled from the second user's access rights.

Execution logic can make, for example, API calls or Apex calls that create or modify one or more database records. Security, authentication, and data integrity concerns create the need to track user context for each of these database operations. In some implementations, the user context when performing operations in the database system identifies the records that can be accessed, who the user accessing a record is, what rights a user has, when certain operations take place and which user initiated such operations, and so forth.

In certain implementations, separate from push-pulling access rights, flow execution requires identifying the user context. For example, the second user that is resuming the paused flow interview may not be the owner or creator of the flow interview. In such scenarios, execution logic going forward should take place in the resuming user's context, not the creator's user context. For instance, if a contact record is created after resuming, attribution of the newly created contact record should be to the second user, rather than the first user who created the flow interview record.

It should be appreciated that the user that created the flow interview still owns the paused interview, but actions by a resuming user are no longer attributed to the creating user.

In various implementations, the user context can determine branching within the execution logic. For example, there may be a system using a user context variable that is accounted for in the execution logic. For instance, a subordinate agent can create a flow interview for opening a bank account. During the course of interacting with the customer that desires to open the bank account, the subordinate agent encounters a request from the customer that is not authorized to be performed by the subordinate agent (e.g., deposit a large amount, such as $50,000). For example, an option for an initial deposit displayed in a graphical user interface presentation to the subordinate agent may not permit values over $5,000. In response to this request, the support agent can pause the flow interview. A manager can resume the paused flow interview, and based on determining that the user context has been switched, flow execution logic can display an option for an initial deposit over $5,000. Furthermore, additional branches in the flow execution logic may be triggered (and/or removed). For instance, the graphical user interface may newly present the manager with the option to upgrade the new bank account from a silver to gold level account, an option unavailable to the subordinate agent. It should be appreciated that these conditional branches and options in the graphical user interface are associated with the same flow definition. It should further be appreciated that while the examples discussed are in the context of agents pausing a flow, scenarios involving a customer pausing or resuming a flow, or any combination involving agents, customers, and third parties are also enabled.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM object, e.g., an opportunity such as a possible sale of 2000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 8A:
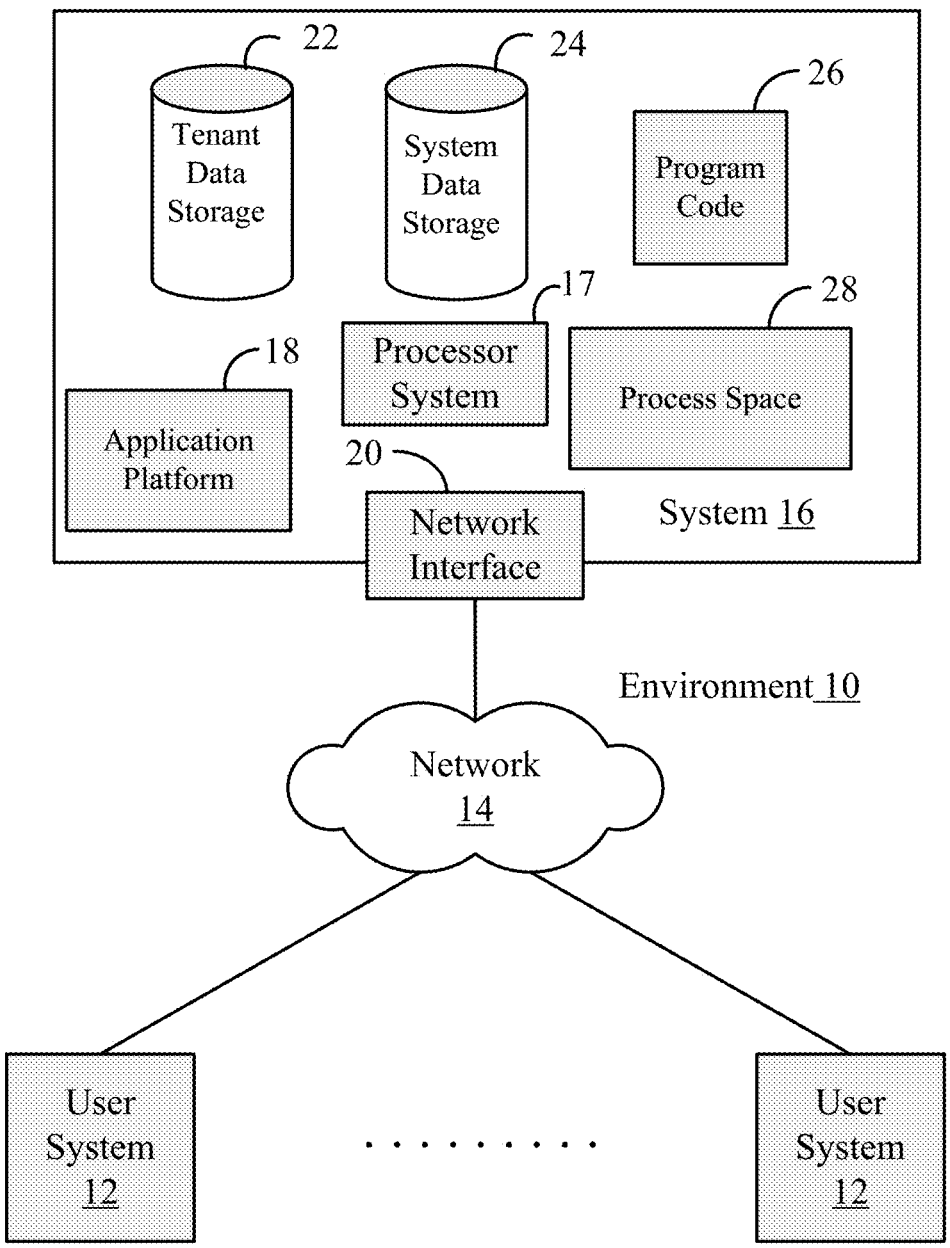
FIG. 8A shows a block diagram of an example of an environment 10 in which an on-demand database service can be used in accordance with some implementations.

FIG. 8A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 8B:
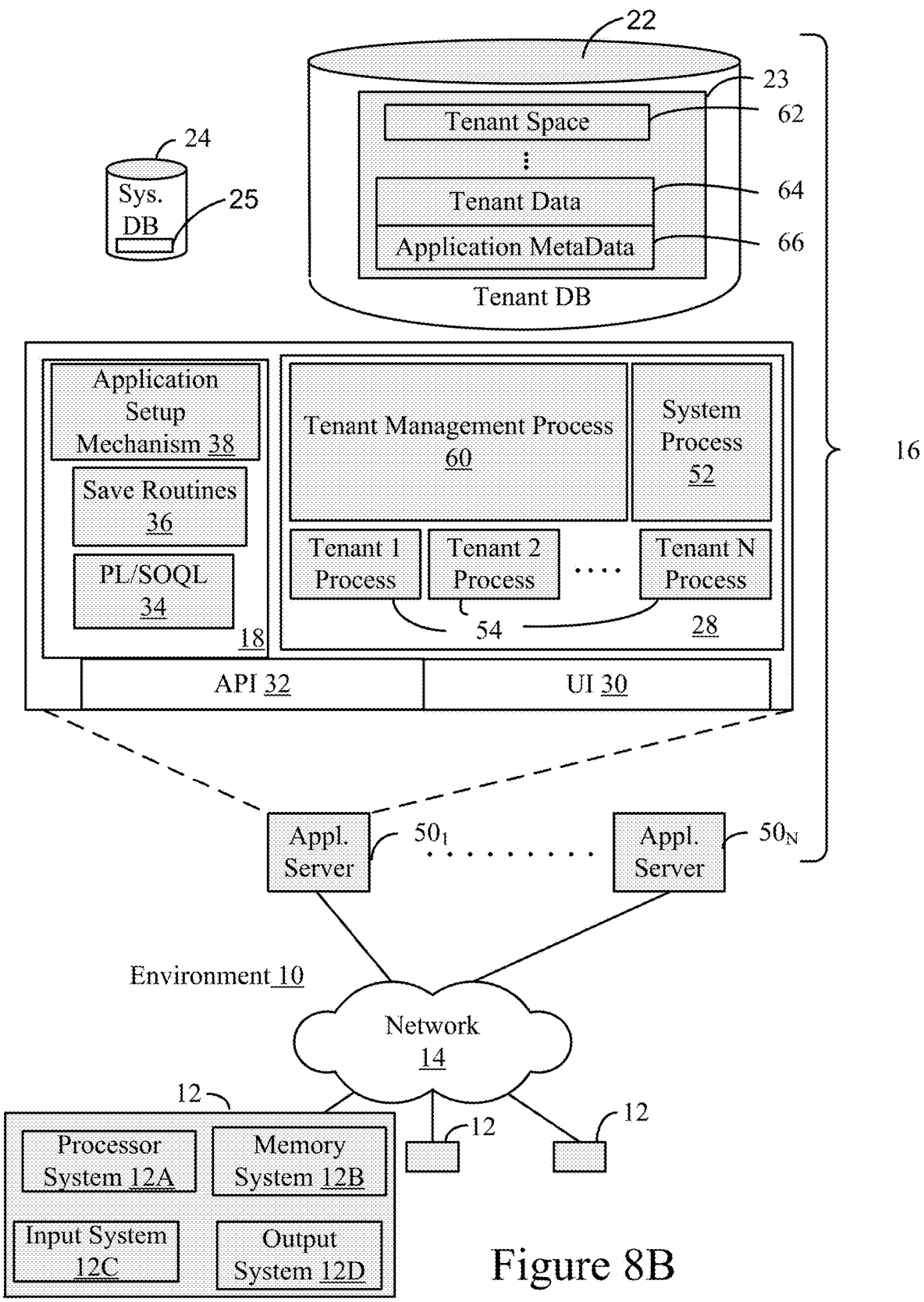
FIG. 8B shows a block diagram of an example of some implementations of elements of FIG. 8A and various possible interconnections between these elements.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,378, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
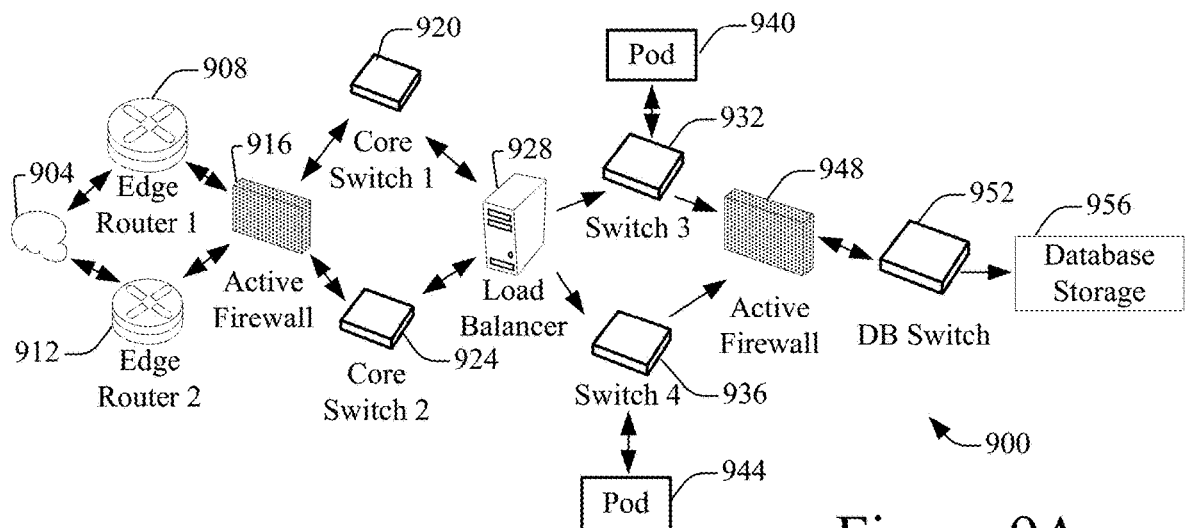
FIG. 9A shows a system diagram of an example of architectural components of an on-demand database service environment 900, in accordance with some implementations.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 7A and 7B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 7A and 7B.

Figure 9B:
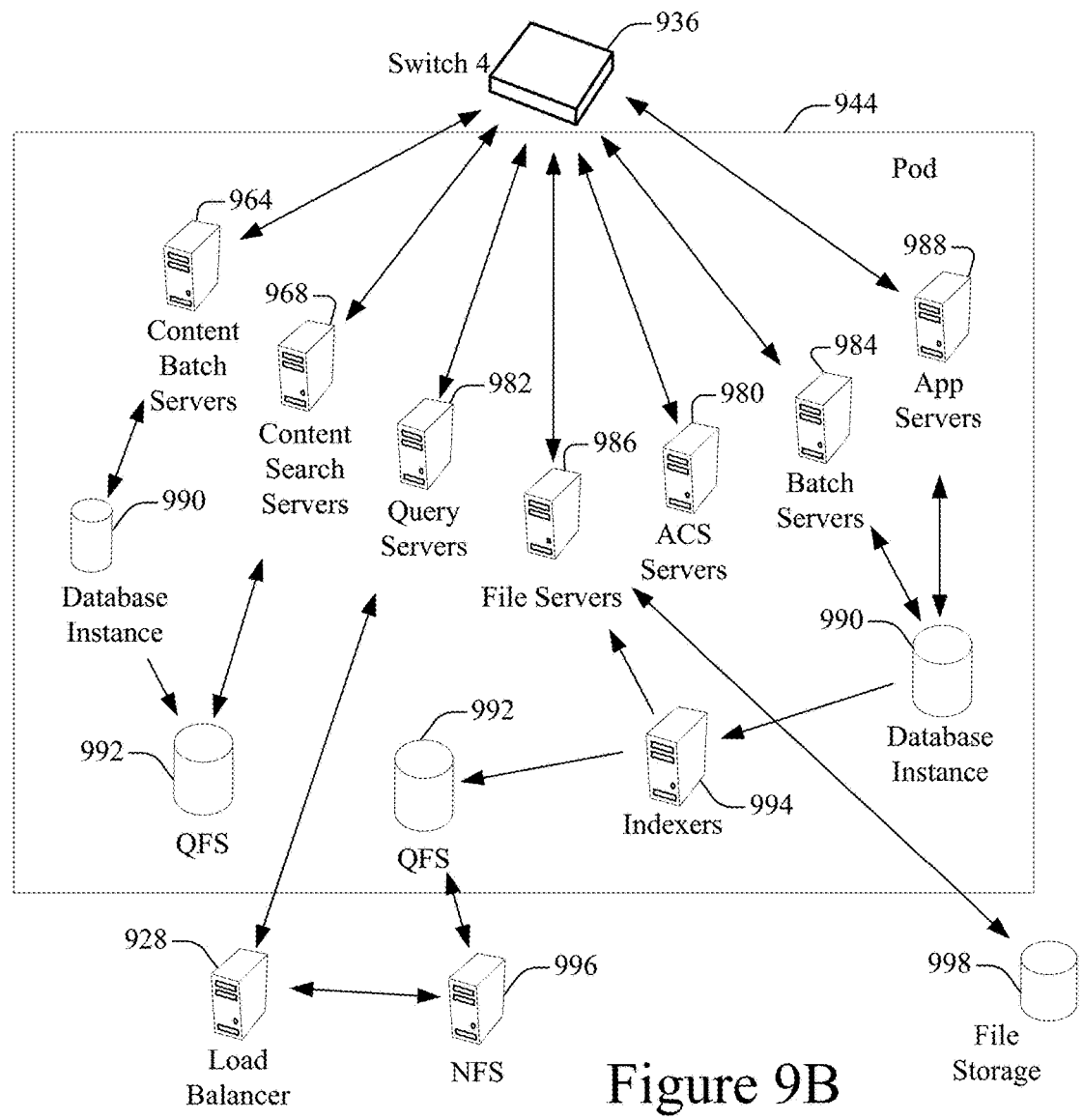
FIG. 9B shows a system diagram further illustrating an example of architectural components of an on-demand database service environment, in accordance with some implementations.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

In some implementations, the app servers 988 may include a hardware and/or software framework dedicated to the execution of procedures (e.g., programs, routines, scripts) for supporting the construction of applications provided by the on-demand database service environment 900 via the pod 944. In some implementations, the hardware and/or software framework of an app server 988 is configured to cause performance of services described herein, including performance of one or more of the operations of methods described herein with reference to FIGS. 1-5. In alternative implementations, two or more app servers 988 may be included to cause such methods to be performed, or one or more other servers described herein can be configured to cause part or all of the disclosed methods to be performed.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system implemented using a server system comprising one or more processors, the database system configurable to cause:
obtaining first data indicating a first communication to a first computing device associated with a first user;
generating or updating, based at least in part on the first communication, a customer relationship management (CRM) record in the database system, the CRM record storing customer sales process data configured to define the CRM record as one of a case, a contract, a lead, an opportunity, or a purchase order;
identifying, based at least in part on the first data, a first flow definition of a plurality of related flow definitions stored as data objects in the database system, the first flow definition defining a first flow of a set of user-assignable tasks to be performed to modify the CRM record;
associating the CRM record with the first flow definition;
providing, to the first computing device, action list data capable of being processed to cause display on the first computing device of an action list identifying a plurality of flows and states as associated with the CRM record, the plurality of flows comprising the first flow, the action list being user-configurable to add, remove and edit flows;
providing, to the first computing device, second data capable of being processed to cause display on the first computing device of a first presentation indicating the first flow as being in a first state, the first presentation comprising a selection selectable by the first user to cause performance of a first subset of the set of tasks of the first flow;
obtaining third data from the first computing device indicating completion of the performance of the first subset of tasks of the first flow, the completed first subset of tasks comprising co-editing of the CRM record by the first user and a customer, the third data causing the first flow to transition to a second state;
detecting an error in connectivity associated with the first computing device;
pausing the first flow responsive to detecting the error in connectivity;
transferring assignment of the paused first flow from the first user to a second user;
resuming the paused first flow after the transfer of assignment; and
providing, to a second computing device associated with the second user, fourth data capable of being processed to cause display on the second computing device of a second presentation indicating the first flow as being in the second state, the second presentation comprising a selection selectable by the second user to cause performance of a second subset of the set of tasks of the first flow.

2. The system of claim 1, the associating of the CRM record with the first flow definition comprising:
generating or updating a first instance of a junction object, the junction object being configurable to store an identifier for the CRM record and an identifier for the first flow definition.

3. The system of claim 2, the junction object further being configurable to provide a many to one relationship between a plurality of instances of the junction object and the CRM record.

4. The system of claim 2, the junction object further being configurable to provide a many to one relationship between a plurality of instances of the junction object and the first flow definition.

5. The system of claim 2, the junction object further being configurable to indicate one of a plurality of states of the first flow definition.

6. The system of claim 2, the junction object further being configurable to indicate an order for each flow definition in the plurality of flow definitions for display in the first presentation.

7. The system of claim 2, the first instance of the junction object being further configurable to be created in response to a creation or change of the CRM record.

8. The system of claim 2, the junction object being further configurable to indicate whether each flow definition in the plurality of flow definitions for display in the first presentation is removable from the first presentation.

9. The system of claim 2, the first presentation further comprising a selection for causing a second flow definition not included in the related flow definitions to be associated with the CRM record using a second instance of the junction object.

10. The system of claim 1, the database system further configurable to cause:
determining a channel type for the first communication;
identifying the first flow definition based at least in part on the determined channel type for the first communication; and
displaying the first presentation indicating the first flow definition in response to determining the channel type for the first communication.

11. The system of claim 1, the database system further configurable to cause:
providing a subset of the first data indicating the first communication to the first flow definition;
and updating the CRM record based on the subset of first data.

12. A computer-implemented method comprising:
obtaining first data indicating a first communication to a first computing device associated with a first user;
generating or updating, based at least in part on the first communication, a customer relationship management (CRM) record in a database system implemented using a server system comprising one or more processors, the CRM record storing customer sales process data configured to define the CRM record as one of a case, a contract, a lead, an opportunity, or a purchase order;
identifying, based at least in part on the first data, a first flow definition of a plurality of related flow definitions stored as data objects in the database system, the first flow definition defining a first flow of a set of user-assignable tasks to be performed to modify the CRM record;
associating the CRM record with the first flow definition;
providing, to the first computing device, action list data capable of being processed to cause display on the first computing device of an action list identifying a plurality of flows and states as associated with the CRM record, the plurality of flows comprising the first flow, the action list being user-configurable to add, remove and edit flows;
providing, to the first computing device, second data capable of being processed to cause display on the first computing device of a first presentation indicating the first flow as being in a first state, the first presentation comprising a selection selectable by the first user to cause performance of a first subset of the set of tasks of the first flow;
obtaining third data from the first computing device indicating completion of the performance of the first subset of tasks of the first flow, the completed first subset of tasks comprising co-editing of the CRM record by the first user and a customer, the third data causing the first flow to transition to a second state;
detecting an error in connectivity associated with the first computing device;
pausing the first flow responsive to detecting the error in connectivity;
transferring assignment of the paused first flow from the first user to a second user;
resuming the paused first flow after the transfer of assignment and
providing, to a second computing device associated with the second user, fourth data capable of being processed to cause display on the second computing device of a second presentation indicating the first flow as being in the second state, the second presentation comprising a selection selectable by the second user to cause performance of a second subset of the set of tasks of the first flow.

13. The method of claim 12, the associating of the CRM record with the first flow definition comprising:
generating or updating a first instance of a junction object, the junction object being configurable to store an identifier for the CRM record and an identifier for the first flow definition.

14. The method of claim 13, the first presentation further comprising a selection for causing a second flow definition not included in the related flow definitions to be associated with the CRM record using a second instance of the junction object.

15. The method of claim 12, further comprising:
determining a channel type for the first communication;
identifying the first flow definition based at least in part on the determined channel type for the first communication; and
displaying the first presentation indicating the first flow definition in response to determining the channel type for the first communication.

16. The method of claim 15, further comprising:
providing a subset of the first data indicating the first communication to the first flow definition;
and updating the CRM record based on the subset of first data.

17. A computer program product comprising computer-readable program code stored on a non-transitory computer-readable medium, to be executed by one or more processors, when retrieved from the non-transitory computer-readable medium, the program code comprising instructions configured to cause: obtaining first data indicating a first communication to a first computing device associated with a first user; generating or updating, based at least in part on the first communication, a customer relationship management (CRM) record in a database system implemented using a server system comprising one or more processors, the CRM record storing customer sales process data configured to define the CRM record as one of a case, a contract, a lead, an opportunity, or a purchase order; identifying, based at least in part on the first data, a first flow definition of a plurality of related flow definitions stored as data objects in the database system, the first flow definition defining a first flow of a set of user-assignable tasks to be performed to modify the CRM record; associating the CRM record with the first flow definition; providing, to the first computing device, action list data capable of being processed to cause display on the first computing device of an action list identifying a plurality of flows and states as associated with the CRM record, the plurality of flows comprising the first flow, the action list being user-configurable to add, remove and edit flows; providing, to the first computing device, second data capable of being processed to cause display on the first computing device of a first presentation indicating the first flow as being in a first state, the first presentation comprising a selection selectable by the first user to cause performance of a first subset of the set of tasks of the first flow; obtaining third data from the first computing device indicating completion of the performance of the first subset of tasks of the first flow, the completed first subset of tasks comprising co-editing of the CRM record by the first user and a customer, the third data causing the first flow to transition to a second state; detecting an error in connectivity associated with the first computing device; pausing the first flow responsive to detecting the error in connectivity; transferring assignment of the paused first flow from the first user to a second user; resuming the paused first flow after the transfer of assignment; and providing, to a second computing device associated with the second user, fourth data capable of being processed to cause display on the second computing device of a second presentation indicating the first flow as being in the second state, the second presentation comprising a selection selectable by the second user to cause performance of a second subset of the set of tasks of the first flow.

18. The computer program product of claim 17, the associating of the CRM record with the first flow definition comprising:

generating or updating a first instance of a junction object, the junction object being configurable to store an identifier for the CRM record and an identifier for the first flow definition.

19. The computer program product of claim 18, the first presentation further comprising a selection for causing a second flow definition not included in the related flow definitions to be associated with the CRM record using a second instance of the junction object.

20. The computer program product of claim 17, the instructions further configured to cause:

determining a channel type for the first communication;
identifying the first flow definition based at least in part on the determined channel type for the first communication; and
displaying the first presentation indicating the first flow definition in response to determining the channel type for the first communication.

* * * * *